United States Patent
Gupta et al.

(10) Patent No.: US 11,879,977 B2
(45) Date of Patent: Jan. 23, 2024

(54) SYSTEM OF VEHICLES EQUIPPED WITH IMAGING EQUIPMENT FOR HIGH-DEFINITION NEAR REAL-TIME MAP GENERATION

(71) Applicant: Woven by Toyota, U.S., Inc., Palo Alto, CA (US)

(72) Inventors: Ro Gupta, Brooklyn, NY (US); Justin Day, Brooklyn, NY (US); Chase Nicholl, Brooklyn, NY (US); Max Henstell, Portland, OR (US); Ioannis Stamos, Brooklyn, NY (US); David Boyle, Brooklyn, NY (US); Ethan Sorrelgreen, Seattle, WA (US); Huong Dinh, New York, NY (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 236 days.

(21) Appl. No.: 17/216,043

(22) Filed: Mar. 29, 2021

(65) Prior Publication Data
US 2021/0216794 A1    Jul. 15, 2021

Related U.S. Application Data

(62) Division of application No. 15/995,041, filed on May 31, 2018.
(Continued)

(51) Int. Cl.
*B60R 1/00*    (2022.01)
*G06V 20/58*    (2022.01)
(Continued)

(52) U.S. Cl.
CPC .............. *G01S 17/88* (2013.01); *B60R 1/00* (2013.01); *G01C 21/3841* (2020.08);
(Continued)

(58) Field of Classification Search
CPC .............. B60R 1/00; B60R 2300/302; B60R 2300/406; B60R 11/04; G01C 21/3841;
(Continued)

(56) References Cited

U.S. PATENT DOCUMENTS 6,292,215 B1    9/2001    Vincent
6,734,787 B2    5/2004    Ikeda
(Continued)

FOREIGN PATENT DOCUMENTS

EP    2 378 465 A1    10/2011

OTHER PUBLICATIONS

Curtis et al., "A ubiquitous method for street scale spatial data collection and analysis in challenging urban environments: mapping health risks using spatial video in Haiti", Apr. 2013, BioMed Central, International Journal of Health Geographics, vol. 12, No. 21, p. 1-14. (Year: 2013).*
(Continued)

*Primary Examiner* — Vincent Rudolph
*Assistant Examiner* — Timothy Choi
(74) *Attorney, Agent, or Firm* — Christopher G. Darrow; Darrow Mustafa PC

(57) ABSTRACT

Described are street level intelligence platforms, systems, and methods that can include a fleet of swarm vehicles having imaging devices. Images captured by the imaging devices can be used to produce and/or be integrated into maps of the area to produce high-definition maps in near real-time. Such maps may provide enhanced street level intelligence useful for fleet management, navigation, traffic monitoring, and/or so forth.

5 Claims, 16 Drawing Sheets

Related U.S. Application Data

(60) Provisional application No. 62/513,056, filed on May 31, 2017.

(51) Int. Cl.

| | | |
|---|---|---|
| *G06V 10/10* | (2022.01) | |
| *G01S 17/88* | (2006.01) | |
| *G01S 17/89* | (2020.01) | |
| *G06T 7/11* | (2017.01) | |
| *G01S 17/86* | (2020.01) | |
| *G01C 21/00* | (2006.01) | |
| *H04W 4/44* | (2018.01) | |
| *G01S 17/42* | (2006.01) | |

(52) U.S. Cl.
CPC ..... *G01C 21/3885* (2020.08); *G01C 21/3893* (2020.08); *G01S 17/86* (2020.01); *G01S 17/89* (2013.01); *G06T 7/11* (2017.01); *G06V 10/17* (2022.01); *G06V 20/58* (2022.01); *G06V 20/584* (2022.01); *H04W 4/44* (2018.02); *B60R 2300/207* (2013.01); *B60R 2300/301* (2013.01); *B60R 2300/302* (2013.01); *B60R 2300/406* (2013.01); *B60R 2300/50* (2013.01); *G01S 17/42* (2013.01); *G06T 2207/30236* (2013.01)

(58) Field of Classification Search
CPC . G01C 21/3885; G01C 21/3893; G01S 17/89; G06V 10/17; G06V 20/58; H04W 4/44; G06T 2207/30236; G06T 2207/30242; G06T 2207/30252; G08G 1/0112; G08G 1/0129; G08G 1/0133; G08G 1/0141
See application file for complete search history.

(56) References Cited

U.S. PATENT DOCUMENTS

| | | |
|---|---|---|
| RE42,289 E | 4/2011 | Vincent |
| 8,156,320 B2 | 4/2012 | Borras et al. |
| 8,213,749 B2 | 7/2012 | Di Bernardo et al. |
| 8,526,973 B2 | 9/2013 | Thomson |
| RE44,925 E | 6/2014 | Vincent |
| 8,817,094 B1 | 8/2014 | Brown et al. |
| 9,055,277 B2 | 6/2015 | Katayama et al. |
| 9,108,640 B2 | 8/2015 | Jackson |
| 9,460,613 B1 | 10/2016 | Whiting et al. |
| 2007/0132773 A1 | 6/2007 | Plante |
| 2007/0217761 A1 | 9/2007 | Chen et al. |
| 2010/0063670 A1 | 3/2010 | Brzezinski et al. |
| 2012/0244849 A1 | 9/2012 | Thomson |
| 2013/0044108 A1 | 2/2013 | Tanaka et al. |
| 2013/0230208 A1 | 9/2013 | Gupta et al. |
| 2013/0231947 A1 | 9/2013 | Shusterman |
| 2014/0233854 A1 | 8/2014 | Zhong et al. |
| 2015/0081215 A1* | 3/2015 | Di Bernardo ........... G06F 16/29 701/532 |
| 2015/0215816 A1 | 7/2015 | Abou-Elkheir et al. |
| 2015/0266472 A1 | 9/2015 | Ferguson et al. |
| 2015/0269841 A1 | 9/2015 | Makozwitz et al. |
| 2015/0379355 A1 | 12/2015 | Kanga et al. |
| 2016/0035096 A1 | 2/2016 | Rudow et al. |
| 2016/0057338 A1 | 2/2016 | Chen et al. |
| 2016/0075282 A1 | 3/2016 | Johnson |
| 2017/0052028 A1 | 2/2017 | Choudhury et al. |
| 2017/0053538 A1 | 2/2017 | Samarasekera et al. |
| 2017/0057338 A1 | 3/2017 | Inagaki et al. |
| 2017/0124476 A1* | 5/2017 | Levinson ............. G05D 1/0088 |
| 2017/0286782 A1 | 10/2017 | Pillai et al. |
| 2017/0332198 A1* | 11/2017 | Dannenbring ........... G06T 7/73 |
| 2018/0349715 A1 | 12/2018 | Gupta et al. |

OTHER PUBLICATIONS

International Search Report and Written Opinion dated Aug. 31, 2018 for International Application No. PCT/US2018/035494, 11 pages.

Extended European Search Report dated Jan. 27, 2021 for European Application No. 188096911, 12 pages.

Bansal, R. et al., "Blur Image Detection using Laplacian Operator and Open-CV," 2016 International Conference System Modeling & Advancement in Research Trends (SMART), IEEE, pp. 63-67 (Nov. 25, 2016).

Bo, C. et al., "SmartLoc: sensing landmarks silently for smartphone-based metropolitan localization," EURASIP Journal on Wireless Communications and Networking 2016, 111, 17 pages; https://doi.org/10.1186/s13638-016-0603-7.

Dozza, M. & González, N. P., "Recognising safety critical events: Can automatic video processing improve naturalistic data analyses?" Accid Anal Prev, 60:298-304 (2013).

Fernández, J. et al., "An Intelligent Surveillance Platform for Large Metropolitan Areas with Dense Sensor Deployment," Sensors 2013, 13:7414-7442; doi:10.3390/s130607414.

Gavrila, D. M. & Philomin, V., "Real-Time Object Detection for "Smart" Vehicles," IEEE Proc. of the 7th IEEE Conference on Computer Vision, Sep. 1999, 7 pages.

Hammoudi, K. et al., "Developing vision-based and cooperative vehicular embedded systems for enhancing road monitoring services," Procedia Computer Science, 52:389-395 (2015).

Joshi, J. et al., "CVMS: Cloud Based Vehicle Monitoring System in VANETs," 2015 International Conference on Connected Vehicles and Expo (ICCVE), IEEE, pp. 106-111 (Oct. 19, 2015).

Kanchev, V. et al., "Blurred Image Regions Detection using Wavelet-based Histograms and SVM," The 6th IEEE International Conference on Intelligent Data Acquisition and Advanced Computing Systems: Technology and Applications, Sep. 15-17, 2011, Prague, Czech Republic, 5 pages.

Koukoumidis, E. et al., "Leveraging Smartphone Cameras for Collaborative Road Advisories," IEEE Transactions on Mobile Computing 2012, 11(5): 707-723.

Kwak, D. et al., "Seeing Is Believing: Sharing Real-Time Visual Traffic Information via Vehicular Clouds," IEEE Access, 4:3617-3631 (2016); doi:10.1109/ACCESS.2016.2569585.

McKeon, R. T. et al., "Obstacle recognition using region-based color segmentation techniques for mobile robot navigation," Proc. SPIE 6384, Intelligent Robots and Computer Vision XXIV: Algorithms, Technigues, and Active Vision, 63840R (Oct. 2, 2006), 10 pages; doi:10.1117/12.686271.

\* cited by examiner

SYSTEM OF VEHICLES EQUIPPED WITH IMAGING EQUIPMENT FOR HIGH-DEFINITION NEAR REAL-TIME MAP GENERATION

CROSS REFERENCE TO RELATED APPLICATIONS

This application is a divisional of U.S. patent application Ser. No. 15/995,041, filed May 31, 2018, which is a non-provisional of, and claims the benefit of priority of U.S. Provisional Patent Application No. 62/513,056, filed May 31, 2017, entitled "Near Real-Time Street Level Intelligence Platform," the disclosure of each of which is hereby incorporated by reference in its entirety

BACKGROUND OF THE INVENTION

Street level intelligence has applications in a wide variety of fields including autonomous driving, architecture, construction, engineering, real estate, advertising, city planning, research and others. A fleet of vehicles equipped with imaging equipment can produce and/or supplement a map with high-definition and/or near-real time data to provide enhanced street level intelligence. In general, the street level intelligence may comprise telematics systems on which commercial fleet managers may rely to keep track of vehicles and drivers when they are out in the field. Some fleets may incorporate cameras to provide liability protection from accidents, moving violations or parking violations.

SUMMARY OF THE INVENTION

Prior methods for capturing street level intelligence at city scale are either expensive or ineffective. Systems like Google Street View involve expensive equipment mounted on modified vehicles, which are driven for the express purpose of collecting data for creating maps and a visual database. Solutions that use volunteers to "crowd source" the data never reach useful scale. In both cases, the data collected becomes stale quickly.

In one aspect, disclosed herein are street level intelligence platforms comprising: at least one mapper vehicle, each mapper vehicle comprising an active data capture system comprising a location determination device, a LiDAR device, and at least one imaging device configured to actively capture data pertaining to an environment surrounding the mapper vehicle within a territory; a fleet of swarm vehicles, each swarm vehicle comprising a passive data capture system comprising a location determination device and a plurality of imaging devices configured to passively capture images of an environment surrounding the swarm vehicle within the territory; and a computing system comprising at least one processor and instructions that when executed by the at least one processor cause the at least one processor to create a street level intelligence application comprising: a data processing pipeline configured to: receive data from the active data capture system, combine data from the LiDAR, the imaging device, and the location determination device, perform feature extraction on the combined data from the active data capture system; receive data from the passive data capture systems, combine data from the imaging devices and the location determination devices, perform feature extraction on the combined data from the passive data capture system; and merge the combined data from the active data capture system with the combined data from the passive data capture system based on the extracted features; a street level intelligence interface; and a fleet manager interface. In various embodiments, the at least one mapper vehicle comprises at least 2, at least 5, at least 10, at least 50, or at least 100 mapper vehicles. In some embodiments, the active data capture system comprises at least one color panoramic camera. In some embodiments, the at least one mapper vehicle refreshes data at least bi-yearly. In some embodiments, the at least one mapper is a dedicated vehicle. In various embodiments, the fleet of swarm vehicles comprises at least 10, at least 50, at least 100, at least 1000, or at least 5000 swarm vehicles. In some embodiments, each swarm vehicle in the fleet of swarm vehicles refreshes data at least monthly. In some embodiments, the fleet of swarm vehicles comprises a third-party fleet of vehicles to which passive data capture systems are affixed. In some embodiments, the passive data capture systems are affixed magnetically. In some embodiments, wherein the passive data capture system comprises a plurality of externally-powered smartphones. In further embodiments, at least one smartphone faces outward from the front of the vehicle to capture video and at least one smartphone faces outward from each side of the vehicle to capture static images. In various embodiments, the territory has an average radius of less than 10 miles, less than 50 miles, or less than 100 miles. In some embodiments, the territory is a neighborhood, a city, a country, or a state. In some embodiments, the merging comprises: performing feature extraction on mapper data to detect landmarks; performing feature extraction on swarm data to detect landmarks; comparing swarm landmarks within a predefine threshold of each mapper landmark to find the same landmarks; and updating the swarm location data when matching features are found. In some embodiments, the street level intelligence interface comprises one or more of: a map overlaid with defined street segments for which pertinent data has been collected; tools allowing a user to view one or more of the street segments; tools allowing the user to select one or more of the street segments and add them to a cart; tools allowing the user to pay for access to the one or more street segments added to the cart; tools allowing the user to download a payload for street segments, for which access has been paid for, containing either 3D or 2D site intelligence or pedestrian analytics; tools allowing the user access payloads previously paid for; and tools allowing the user share accessed payloads with partners or other customers. In some embodiments, the fleet manager interface comprises one or more of: tools allowing a user to see the current location of each fleet vehicle; tools allowing the user to download video offloaded from a fleet vehicle; tools allowing the user request priority offload of video from a fleet vehicle; and tools allowing the user view driver quality data.

In another aspect, disclosed herein are computer-implemented systems comprising: a digital processing device comprising: at least one processor, an operating system configured to perform executable instructions, a memory, and a computer program including instructions executable by the digital processing device to create a street level intelligence application comprising: a software module for receiving data from at least one active data capture system associated with a mapper vehicle, each active data capture system comprising a location determination device, a LiDAR device, and at least one imaging device configured to actively capture data pertaining to an environment surrounding the mapper vehicle within a territory; a software module for combining data from the LiDAR, the imaging device, and the location determination device; a software module for performing feature extraction on the combined data from the active data capture system; a software module for receiving data from a plurality of passive data capture systems associated with a fleet of swarm vehicles, each passive data capture system comprising a location determination device and a plurality of imaging devices configured to passively capture images of an environment surrounding a swarm vehicle within the territory; a software module for combining data from the imaging devices and the location determination devices; a software module for performing feature extraction on the combined data from the passive data capture system; a software module for merging the combined data from the active data capture system with the combined data from the passive data capture system based on the extracted features; a software module for providing a street level intelligence interface; and a software module for providing a fleet manager interface.

In yet another aspect, disclosed herein are non-transitory computer-readable storage media encoded with a computer program including instructions executable by at least one processor to create an application comprising: a software module for receiving data from at least one active data capture system associated with a mapper vehicle, each active data capture system comprising a location determination device, a LiDAR device, and at least one imaging device configured to actively capture data pertaining to an environment surrounding the mapper vehicle within a territory; a software module for combining data from the LiDAR, the imaging device, and the location determination device; a software module for performing feature extraction on the combined data from the active data capture system; a software module for receiving data from a plurality of passive data capture systems associated with a fleet of swarm vehicles, each passive data capture system comprising a location determination device and a plurality of imaging devices configured to passively capture images of an environment surrounding a swarm vehicle within the territory; a software module for combining data from the imaging devices and the location determination devices; a software module for performing feature extraction on the combined data from the passive data capture system; a software module for merging the combined data from the active data capture system with the combined data from the passive data capture system based on the extracted features; a software module for providing a street level intelligence interface; and a software module for providing a fleet manager interface.

In yet another aspect, disclosed herein are computer-implemented methods of generating real-time street level intelligence comprising: receiving data from at least one active data capture system associated with a mapper vehicle, each active data capture system comprising a location determination device, a LiDAR device, and at least one imaging device configured to actively capture data pertaining to an environment surrounding the mapper vehicle within a territory; combining data from the LiDAR, the imaging device, and the location determination device; performing feature extraction on the combined data from the active data capture system; receiving data from a plurality of passive data capture systems associated with a fleet of swarm vehicles, each passive data capture system comprising a location determination device and a plurality of imaging devices configured to passively capture images of an environment surrounding a swarm vehicle within the territory; combining data from the imaging devices and the location determination devices; performing feature extraction on the combined data from the passive data capture system; merging the combined data from the active data capture system with the combined data from the passive data capture system based on the extracted features; providing a street level intelligence interface; and providing a fleet manager interface.

BRIEF DESCRIPTION OF THE DRAWINGS

An understanding of the features and advantages of the described subject matter will be obtained by reference to the following detailed description that sets forth illustrative embodiments and the accompanying drawings of which.

DETAILED DESCRIPTION OF THE INVENTION

Figure 1:
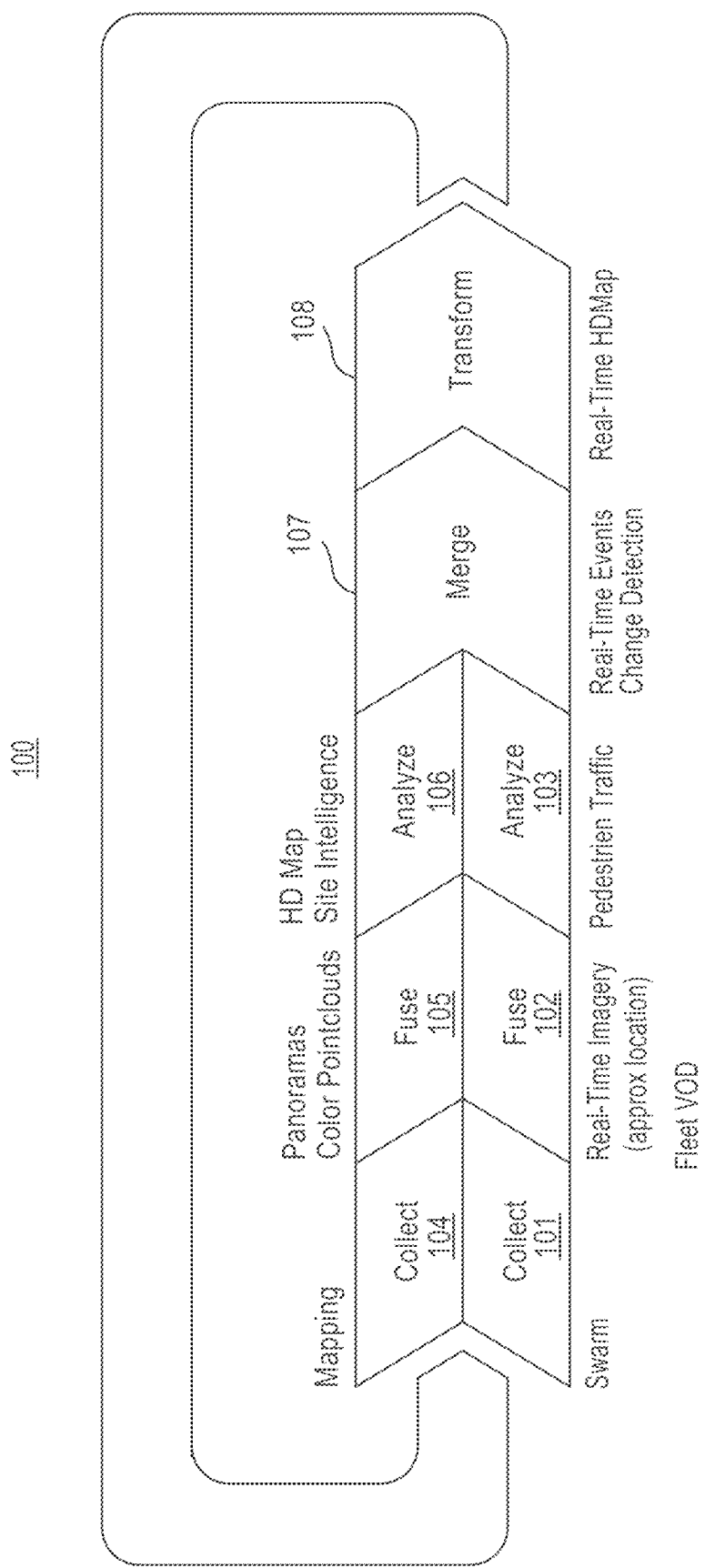
FIG. 1 shows an exemplary overview of a street level intelligence system including a Mapper system and a Swarm system in accordance with some embodiments of the present disclosure.

Described herein, in certain embodiments, are street level intelligence platforms comprising: at least one mapper vehicle, each mapper vehicle comprising an active data capture system comprising a location determination device, a LiDAR device, and at least one imaging device configured to actively capture data pertaining to an environment surrounding the mapper vehicle within a territory; a fleet of swarm vehicles, each swarm vehicle comprising a passive data capture system comprising a location determination device and a plurality of imaging devices configured to passively capture images of an environment surrounding the swarm vehicle within the territory; and a computing system comprising at least one processor and instructions that when executed by the at least one processor cause the at least one processor to create a street level intelligence application comprising: a data processing pipeline configured to: receive data from the active data capture system, combine data from the LiDAR, the imaging device, and the location determination device, perform feature extraction on the combined data from the active data capture system; receive data from the passive data capture systems, combine data from the imaging devices and the location determination devices, perform feature extraction on the combined data from the passive data capture system; and merge the combined data from the active data capture system with the combined data from the passive data capture system based on the extracted features; a street level intelligence interface; and a fleet manager interface.

Also described herein, in certain embodiments, are computer-implemented systems comprising: a digital processing device comprising: at least one processor, an operating system configured to perform executable instructions, a memory, and a computer program including instructions executable by the digital processing device to create a street level intelligence application comprising: a software module for receiving data from at least one active data capture system associated with a mapper vehicle, each active data capture system comprising a location determination device, a LiDAR device, and at least one imaging device configured to actively capture data pertaining to an environment surrounding the mapper vehicle within a territory; a software module for combining data from the LiDAR, the imaging device, and the location determination device; a software module for performing feature extraction on the combined data from the active data capture system; a software module for receiving data from a plurality of passive data capture systems associated with a fleet of swarm vehicles, each passive data capture system comprising a location determination device and a plurality of imaging devices configured to passively capture images of an environment surrounding a swarm vehicle within the territory; a software module for combining data from the imaging devices and the location determination devices; a software module for performing feature extraction on the combined data from the passive data capture system; a software module for merging the combined data from the active data capture system with the combined data from the passive data capture system based on the extracted features; a software module for providing a street level intelligence interface; and a software module for providing a fleet manager interface.

Some embodiments described herein relate to a software-implemented method (e.g., a non-transitory processor readable medium storing code configured to be executed by a processor to perform a method) that includes capturing a video of a streetscape from a camera of a smartphone. A first pass of computer vision analysis can be performed on the video of the streetscape to identify candidate high-priority events. A second pass of computer vision analysis can be performed on candidate high-priority events to identify a high-priority event. In this way, a more detailed analysis of the video of the streetscape can be performed than would otherwise be possible with available computational resources. For example, available resources may be unable to process the video of the streetscape in real time to identify high-priority events, but may be adequate to identify candidate high-priority events in real time and screen candidate high profile events to identify (actual) high profile events. An indication of high-profile events can be sent to a remote analysis service such that high-priority events can be integrated into a map of the streetscape. The remote analysis service may have greater computational resources than are available at a vehicle associated with the smartphone.

Also described herein, in certain embodiments, are non-transitory computer-readable storage media encoded with a computer program including instructions executable by at least one processor to create an application comprising: a software module for receiving data from at least one active data capture system associated with a mapper vehicle, each active data capture system comprising a location determination device, a LiDAR device, and at least one imaging device configured to actively capture data pertaining to an environment surrounding the mapper vehicle within a territory; a software module for combining data from the LiDAR, the imaging device, and the location determination device; a software module for performing feature extraction on the combined data from the active data capture system; a software module for receiving data from a plurality of passive data capture systems associated with a fleet of swarm vehicles, each passive data capture system comprising a location determination device and a plurality of imaging devices configured to passively capture images of an environment surrounding a swarm vehicle within the territory; a software module for combining data from the imaging devices and the location determination devices; a software module for performing feature extraction on the combined data from the passive data capture system; a software module for merging the combined data from the active data capture system with the combined data from the passive data capture system based on the extracted features; a software module for providing a street level intelligence interface; and a software module for providing a fleet manager interface.

Also described herein, in certain embodiments, are computer-implemented methods of generating real-time street level intelligence comprising: receiving data from at least one active data capture system associated with a mapper vehicle, each active data capture system comprising a location determination device, a LiDAR device, and at least one imaging device configured to actively capture data pertaining to an environment surrounding the mapper vehicle within a territory; combining data from the LiDAR, the imaging device, and the location determination device; performing feature extraction on the combined data from the active data capture system; receiving data from a plurality of passive data capture systems associated with a fleet of swarm vehicles, each passive data capture system comprising a location determination device and a plurality of imaging devices configured to passively capture images of an environment surrounding a swarm vehicle within the territory; combining data from the imaging devices and the location determination devices; performing feature extraction on the combined data from the passive data capture system; merging the combined data from the active data capture system with the combined data from the passive data capture system based on the extracted features; providing a street level intelligence interface; and providing a fleet manager interface.

Some embodiments described herein relate to a system that includes multiple vehicles each equipped with a vehicle-mounted smartphone and a video-and-map-integration device. Vehicle-mounted smartphones can continuously capture streetscape video. The vehicle-mounted smartphones may be unable to transfer raw streetscape video to the video-and-map integration device, for example, because average (e.g., daily) bandwidth for a cellular data network is less than what would be required to transfer video. The vehicle-mounted smartphones can therefore locally store streetscape video (e.g., using internal memory and/or peripheral local storage). In some instances, vehicle-mounted smartphones can be operable to store at least eight hours of streetscape footage. Vehicle-mounted smartphones can also be operable to identify high-priority features in streetscape video and send a portion of the video containing the high-priority feature to the video-and-map-integration device, e.g., via the smartphone's cellular data radio and/or a cellular data network. The video-and-map integration device can be operable to integrate high-priority events into a map and send updated maps to the fleet of vehicle-mounted smartphones over the cellular data network. In this way, the fleet can be alerted to high-priority events in near real-time (e.g., within 3 hours). When vehicles returns to a home location (e.g., a garage), vehicle-mounted smartphones can connect to a WiFi network, which may have higher bandwidth than the cellular data network and/or at which the vehicles may spend a greater amount of time, and transfer locally stored streetscape video to the video-and-map-integration device via the vehicle-mounted smartphone's WiFi radios. The video-and-map-integration device can be operable to integrate video received via WiFi into the map so that the map is updated at least daily. Updated maps can be sent to map-viewer devices, vehicle-mounted smartphones, and/or navigation devices.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "Swarm" refers to a passive capture system capable of passively capturing images and/or videos of a surrounding environment and depicts traffic impacting events in real-time. In some instances, a Swarm system can be provided by a third-party fleet which may have multiple vehicles outfitted with Swarm systems for data collecting and processing. Intelligence products, such as pedestrian foot traffic for each segment of the map, can be derived at the block or neighborhood level with a relatively short refresh rate, for example, nightly, weekly, or a monthly.

As used herein, "Mapper" refers to an active capture system capable of actively capturing images and videos of a surrounding environment and generating high-resolution graphical representations, such as a 2D or three-dimensional (3D) base map. In some instances, the Mapper system can be arranged on a dedicated vehicle with multiple sensors for sensing the surrounding environment and collecting data. The data can be used for deriving the high-resolution 2D and 3D map at an address level with a relatively long refresh rate, for example, a bi-yearly refresh rate.

In accordance with some embodiments of the present disclosure, the Mapper system and Swarm system as discussed above can be configured to operate in a combined manner, thereby dataset provided by the Mapper system being more accurate and dataset provided by the Swarm system being updated more regularly. In some instances, the combination of these two types of datasets can be carried out via feature extraction and feature matching based on machine learning.

Overview

Referring to FIG. 1, in a particular embodiment, a street level intelligence system 100 may comprise two sub-systems, i.e., a Mapper system and a Swarm system. The Swarm system as shown may comprise a Collect module 101, a Fuse module 102, and an Analyze module 103. Similarly and correspondingly, the Mapper system as shown may comprise a Collect module 104, a Fuse module 105, and an Analyze module 106. Further illustrated are a Merge module 107 and a Transform module 108, which may be shared by the Mapper system and Swarm system and are capable of merging the data from the analyze modules and transforming the merged data into a desired format for utilization.

In some instances, the Collect module 101 of the Swarm system may comprise one or more imaging devices for capturing still images or video. The imaging device can be configured to detect electromagnetic radiation (e.g., visible, infrared, and/or ultraviolet light, etc.) and generate image data based on the detected electromagnetic radiation. The imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by the imaging device can include one or more images, which may be static images (e.g., photographs), dynamic images (e.g., video), or suitable combinations thereof. The image data can be polychromatic (e.g., RGB, CMYK, HSV, etc.) or monochromatic (e.g., grayscale, black-and-white, sepia, etc.). The imaging device may include a lens configured to direct light onto an image sensor.

In some embodiments, the imaging device can be embodied as a smartphone which may include one or more cameras capable of capturing still or dynamic image data (e.g., video). The camera can be a still camera that captures static images (e.g., photographs). The camera may capture both dynamic image and static images. The camera may switch between capturing dynamic images and static images. Although certain embodiments provided herein are described in the context of smartphones, it shall be understood that the present disclosure can be applied to any suitable imaging device, and any description herein relating to a cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc.). The camera may capture color images, greyscale image, infrared images, and the like. The camera may be a thermal imaging device when it is configured to capture infrared images.

In some embodiments, the imaging device (e.g., a smartphone) and/or other local (e.g., on-vehicle) computational resources may be limited. For example, the imaging device may include moderate processing and/or memory (e.g., partially or completely disposed within the housing of the smartphone). Furthermore, the imaging device, when in the field, may have a limited bandwidth, including periods of no connectivity to more robust processing capabilities, such as cloud computing resources. For example, a cellular data network accessible to the imaging device may not provide sufficient bandwidth to transfer continuously collected video and/or rates charged by cellular data network carriers for transferring data may make transfer of continuously collected video cost-prohibitive. Accordingly, as described in further detail here, some embodiments relate to systems and methods for processing and analyzing data captured by the imaging device to provide better results than would otherwise be possible with available computational resources and/or for managing data transfers from the imaging device to remote storage and/or analysis facilities.

Figure 6:
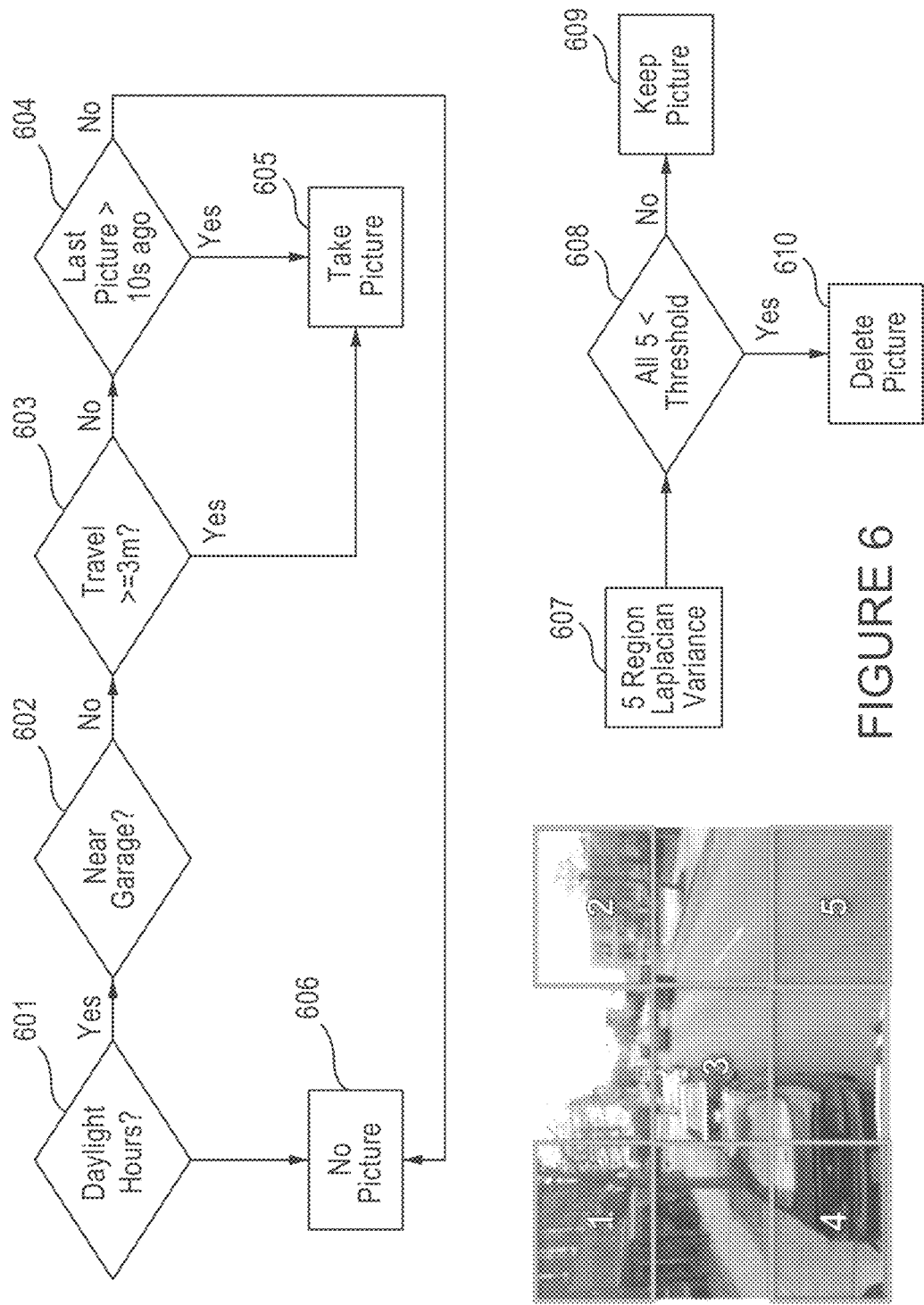
FIG. 6 shows a non-limiting example of Swarm selective capture logic in accordance with some embodiments of the present disclosure.

The Collect module 101 of the Swarm system can be started automatically when the Swarm system boots. In some instances, when the Swarm system is installed on a smartphone which may be used as an imaging device for data collection, the collect module 101 can be configured to commence capturing the images or videos once the smartphone is disconnected from a Wi-Fi network, for example, when the smartphone is mounted on a vehicle of the fleet and the vehicle is moving out of the fleet garage and in the street. During the capture processing, if high-resolution still images are captured, motion blur may be encountered and should be taken into account through a Swarm selective capture logic as illustrated in FIG. 6, as is discussed herein.

In addition to using the imaging device to capture the images and videos, the Collect module 101 may also comprise one or more sensors, for example, vision sensors, positioning sensors such as Global Position System (GPS) sensors, or inertial sensors such as accelerometers, gyroscopes, and/or gravity detection sensors. Thereby, additional data such as time, frame numbers, locations, speeds, accelerations, light levels and counts nearby of Bluetooth/Wi-Fi devices can be captured or collected by one or more of these sensors and then can be fused together with the image or video data by the Fuse module 102 of the Swarm system. Upon fusing operations via the Fuse module 102, real-time or near real-time imagery with approximate or changing location can be achieved for Video-on-Demand (VOD) services, for example, requested by a fleet manager or a potential third-party for driver analysis.

In some instances, the Collect module 101 of the Swarm system may additionally transmit location and status reports to a remote server on a regular basis, for example, via a Hyper Text Transfer Protocol (HTTPS) over a wireless communication system. The remote server herein may be a cloud server at a remote site or a server located or owned by a third party.

In some instances, the Analyze module 103 of the Swarm system may analyze the captured imagery and apply processing algorithms to determine the pedestrian traffic, which will be discussed in detail later with reference to FIG. 10.

In some instances, for collecting and obtaining high-resolution images and videos, the Collect module 104 of the Mapper system may comprise hardware with high precision and definition. For example, the Collect module 104 of the Mapper system may comprise an advanced GPS/Global Navigation Satellite System (GNSS), or Inertial Measurement Unit (IMU) sensors for location and orientation determination. Further, the Collect module 104 may comprise one or more LiDAR sensors for forming point cloud data and a spherical digital video camera system, such as PointGray Ladybug 5, for filming or capturing panoramic images. The hardware mentioned herein is only for an illustrative purpose and an example of the Mapper system including suitable hardware is described with reference to FIG. 10.

The various types of data, such as high-resolution images and videos, time data, location data can be collected into files with corresponding formats. The files may include, but are not limited to, WMV files, ASF files, ASX files, RM files, RMVB files, MPG files, MPEG files, MPE files, 3GP files, MOV files, MP4 files, M4V files, AVI files, DAT files, MKV files, FLU files, VOB files, JPG files, TIFF files, RAM files, BMP files, GIF files, PNG files, PCX files, WMF files, PCX files, SWF files, GDF files, KIWI files, NavTech files, raw network PACP files, Ladybug PGR files, and GPS files. In some embodiments, some of these files are fused with one another as appropriate by the Fuse module 105 of the Mapper system. For example, the LiDAR data from PCAP files can be combined with GNSS data to create point cloud slices in CSV files and position/orientation information in POSE files. By a further combination of SCAN, POSE, and rectified JPG files, registered and colorized point cloud slices can be created. After that, the Analyze module 106 can generate high definition or resolution map and site intelligence can be achieved by performing feature extraction and other necessary data processing. It should be understood that the descriptions of the operations of the Fuse module 105 and the Analyze module 106 are only illustrative of some aspects of the processing performed thereby and detailed discussions will be made later with reference to FIGS. 10 and 12, which illustrate further details of the processing flow of the Mapper system and Swarm systems.

As shown in FIG. 1, subsequent to analyzing the data respectively by the Analyze module 103 and Analyze module 106, the resultant data from the Mapper system and Swarm system can be merged and transformed by the Merge module 107 and Transform module 108, respectively, in accordance with some embodiments of the present disclosure. In some instances, with the aid of a deep learning technique, one or more machine learning models can be established and trained to detect objects or features, such as windows, signage (e.g., road signs or advertising signs) and other landmarks. For example, when the features are related to the windows, feature extraction can be performed on the Mapper data to detect windows and likewise, feature extraction can be performed on the Swarm data to detect windows. Then, the windows detected in the Mapper data can be compared to those detected in the Swarm data so as to determine whether they are the same. If this is the case, it means that the Swarm data is correct in this regard. However, if this is not the case, then the Swarm data with respect to the windows can be updated, for example, location data, thereby improving the accuracy of the Swarm data. Further, in some instances, with the aid of the Merge module 107, the image can be localized (i.e., image localization) and therefore real-time high definition map can be obtained at the Transform module 108. In addition, based on the merging operations at the Merge module 107, predictions regarding the pedestrian foot traffic can be changed and mapping can be prioritized at the Transform module 108.

The above has discussed modules or blocks of the street level intelligence system and main functionality thereof. It should be understood that the descriptions herein of these modules and their operations are only for illustrative purposes and a person skilled in the art, based on the teaching of the present disclosure, can add, remove, omit, or combine one or more of the modules without departing from the spirit and scope of the present disclosure. Further, by an efficient and effective combination of Mapper data from the Mapper system and Swarm data from the Swarm system, the street level intelligence system in accordance with the embodiments of the present disclosure can be both high-resolution and kept current and insights can be derived from two combined datasets using machine learning technique. Further, with the aid of the machine learning based feature extraction and feature matching, the Swarm data can be made more accurate and the Mapper data can be updated more regularly.

Figure 2:
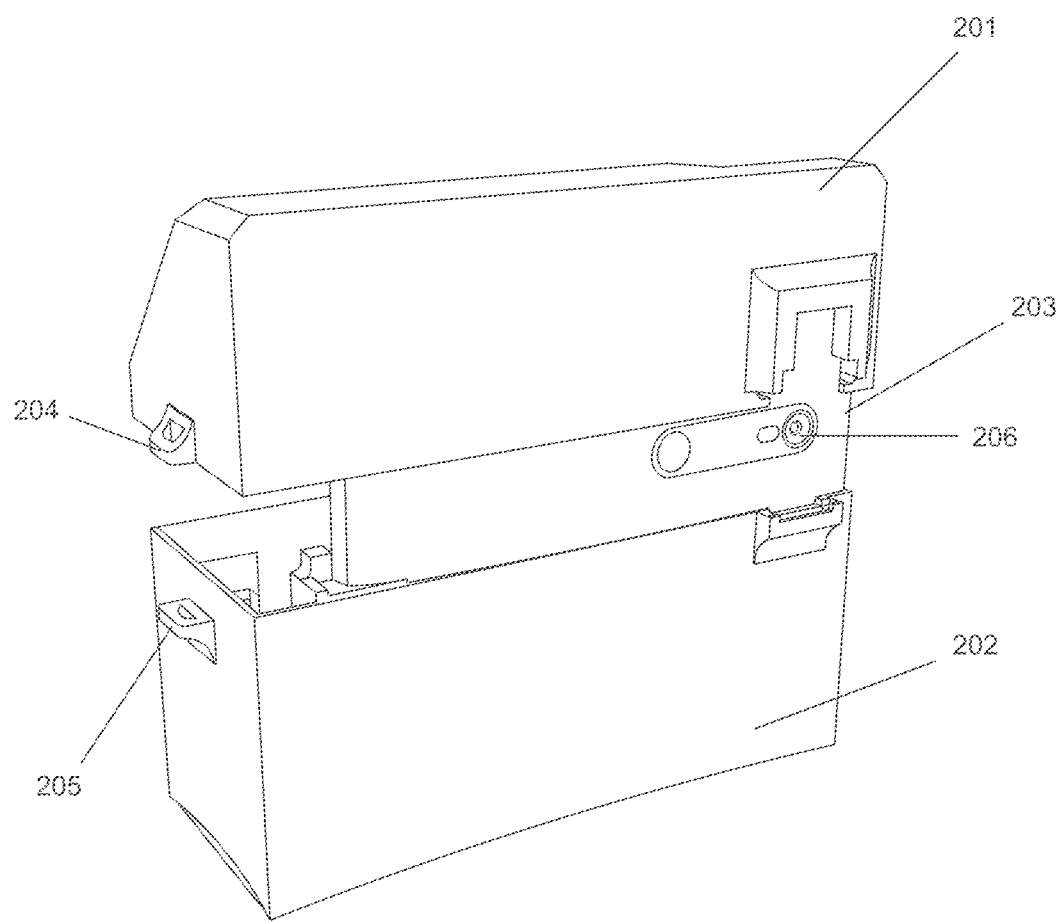
FIG. 2 shows a front left view of a Swarm capture device with a housing in accordance with some embodiments of the present disclosure.

Referring to FIG. 2, in a particular embodiment, a Swarm capture device 200 may comprise a housing for accommodating an imaging device. The housing may have two parts, i.e., a first main component 201 and a second main component 202, which can be designed as complementary for fastening and tightening the imaging device in a vehicle. In some instances, the first main component and the second main component can be movably connected to one another with a connecting mechanism, such as a locking or clamping mechanism. In some instances, the first main component and the second main component can be a single piece with a pull-out design such that the imaging device can be inserted therein when the two main components are pulled in different directions. The housing may further comprise two protrusion components 204 and 205, which are complementary to one another and arranged respectively on the first main component and second main component. Both protrusion components can be attached to one another by, for example, a connecting component, such as a bolt, a belt, a screw, a nut or the like, such that the imaging device can be tightly clasped in the housing. Further, the protrusion components herein can also be attached to other connecting mechanisms or components in the vehicle such that the imaging device can be fastened to the vehicle for image collection.

The imaging device 203 as shown is embodied as a smartphone with a camera 206 for exemplary purposes; other imaging device, such as a camera, is also possible. The smartphone can be placed or inserted in the housing for image capture. In some instances, the Swarm capture device may optionally have one or more power units, such as battery units for powering the smartphone, thereby extending the shooting time of the smartphone when the power level of the smartphone is lower than a predetermined threshold. Further, the Swarm capture device may further comprise one or more slots or ports for connecting the smartphone to other devices, for example, other imaging devices arranged on the same vehicle for imaging capture, which is exemplarily shown in FIG. 5.

In some embodiments, some functions of the smartphone can be disabled and thereby it is dedicated to capture the image and video surrounding the vehicle. For example, when placed in the housing and prepared for shooting, the call function of the smartphone can be disabled. In some instances, to save the power, other functions, such as receiving short messages, can also be disabled. Further, the smartphone can be set into a flight mode in which no communication can be made and thus power of the smartphone can be further saved for environmental data collection.

Figure 3:
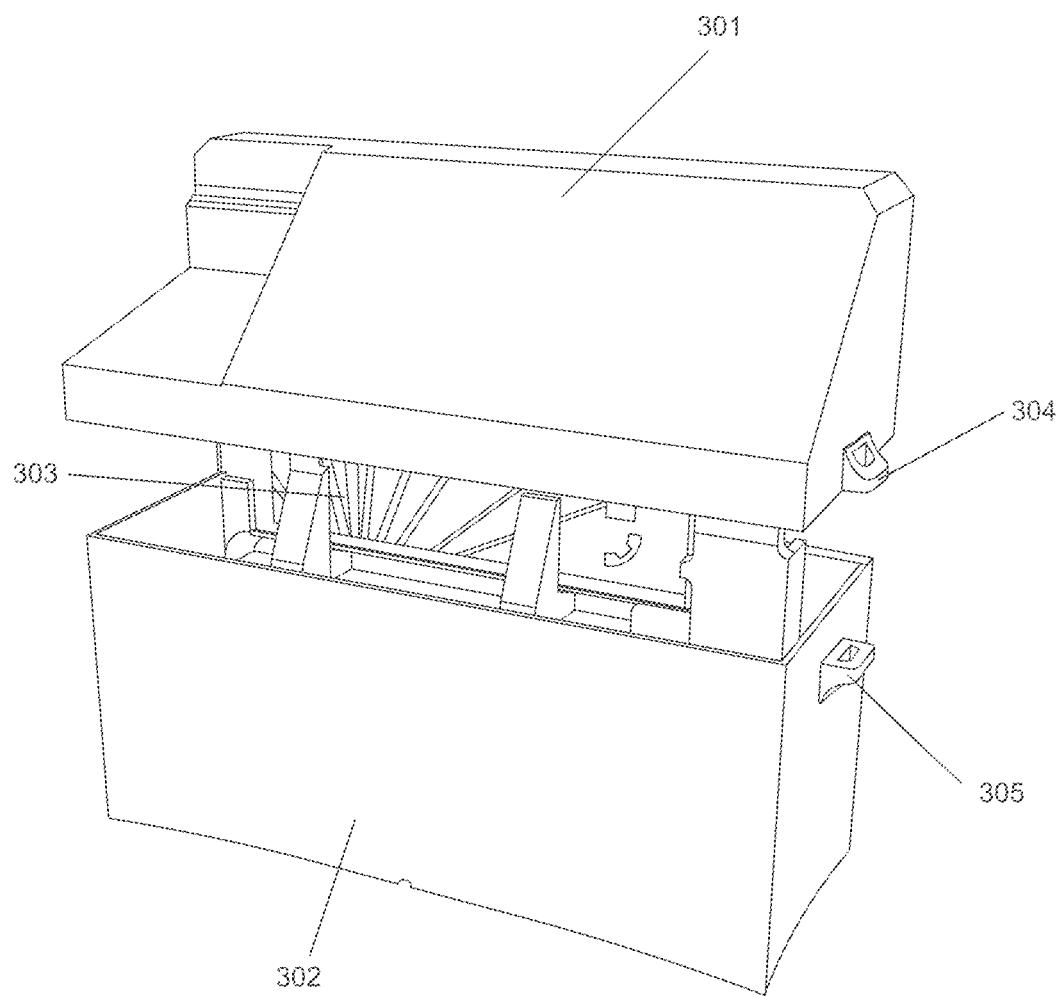
FIG. 3 shows a front right view of a Swarm capture device with a housing in accordance with some embodiments of the present disclosure.

Referring to FIG. 3, a front right view of a Swarm capture device 300 is shown. It should be understood that the Swarm capture device 300 can be similar or equal to the Swarm capture device 200 as shown in FIG. 2. Therefore, any descriptions of the Swarm capture device with respect to FIG. 2 can be equally applied to the Swarm capture device 300 herein.

As shown in FIG. 3, the Swarm capture device 300 has a housing comprising a first main component 301 and a second main component 302 which can accommodate an imaging device 303 inserted therein. Further, the housing may further comprise two protrusion components for fastening the Swarm capture device 300 in place when capturing the images. The imaging device 303 herein is depicted as a smartphone, which can be the same as shown in FIG. 2. Similar to the descriptions made with respect to FIG. 2, the smartphone herein can be configured to be exclusively used for image collection. Additionally or alternatively, the smartphone can also be connected with a Bluetooth connection; therefore, a call function can still be enabled even if the smartphone is operating to capture the images and videos.

The smartphone as shown in FIGS. 2 and 3 can be configured to run on any suitable operation system (OS), for example, an Android OS or a Mac OS. In some instances, the smartphones in accordance with some embodiments of the present disclosure can be configured to run a customized version of a LinageOS (formerly Cyanogen) Android distribution. This customization may enable the smartphone of boot-on-power, remote access, and additional logging. For example, as discussed in further detail herein, a smartphone can be connected to vehicle power in such a manner that the smartphone can detect when the vehicle engine has been turned on and/or off. The smartphones can be configured to operate in a "headless" manner, for example, disabling call functionality, some and/or all input modes, configured to provide custom output, and/or so forth. For example, the smartphones can be configured to power on when the vehicle is turned on, automatically enter a data capture mode (e.g., capturing video and/or pictures of a streetscape), disable call functionality, and/or power off or enter a power saving state when the vehicle is turned off. Moreover, the smartphones can be configured to automatically capture data when certain conditions are met, such as when the smartphone detects it has left a home base or garage (e.g., via GPS and/or inertial sensors), when it is in an area that has not previously and/or recently been imaged (e.g., based on data received from a remote analysis, monitoring, and/or coordination device (e.g., a Real-Time Events Service, as described in further detail herein). The smartphones can also be configured to automatically cease capturing data when certain such as when the smartphone detects it has entered a home base or garage. Furthermore, the smartphones can be configured to automatically send data to a remote analysis, monitoring, and/or coordination device and/or manage modes through with data is sent. For example, smartphones can be configured to use a relatively low-bandwidth and/or high cost network (e.g., cellular data networks, such as an LTE network) to send indications of high-priority events, while storing low-priority data (e.g., video data) locally until a relatively high-bandwidth and/or low cost network is available (such as WiFi or a wired local area network). Similarly stated, the smartphones can be configured to connect to WiFi when they detect that they have entered a home base or garage and upload video data via the WiFi network. In addition or alternatively, the smartphones can be configured to periodically contacts a remote analysis, monitoring, and/or coordination device for instructions, map updates, indications of high-priority events detected by other smartphones, and/or the like.

Figure 4:
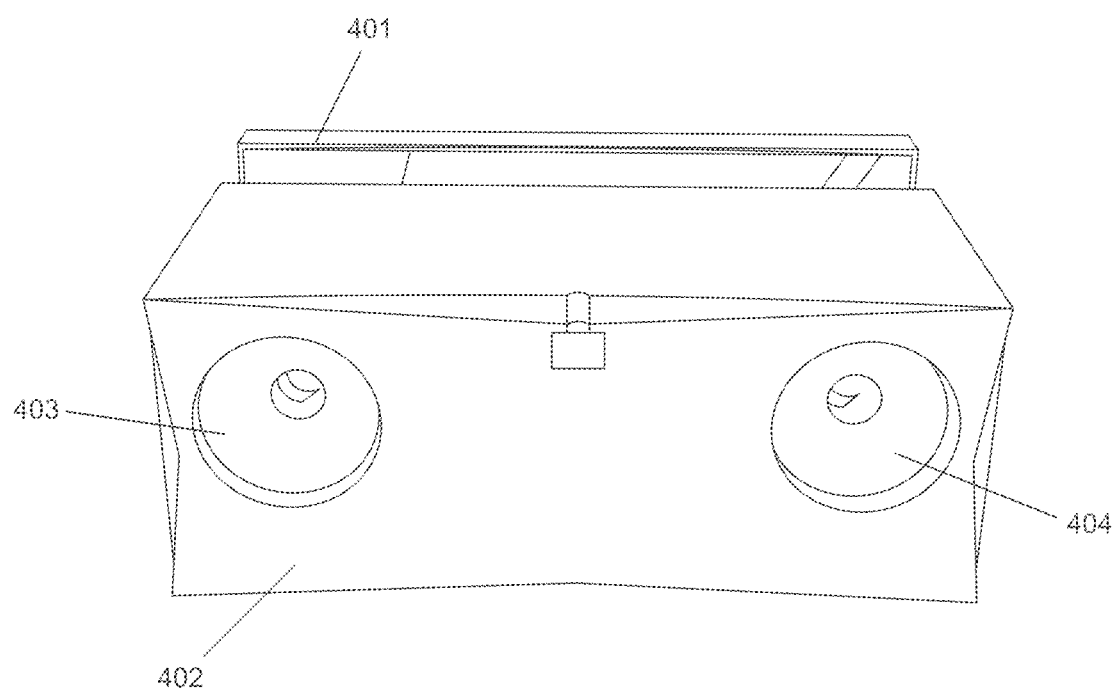
FIG. 4 shows a bottom view of a Swarm capture device with a housing in accordance with some embodiments of the present disclosure.

Referring to FIG. 4, a bottom view of a Swarm capture device 400 is shown. The Swarm capture device 400 herein may be similar or equal to the one respectively shown in FIGS. 2 and 3. Therefore, any descriptions of the Swarm capture device made before with respect to FIGS. 2 and 3 can be equally applied to the Swarm capture device 400. The Swarm capture device 400 has a housing comprising a first main component 401 and a second main component 402. Also shown at the bottom of the Swarm capture device are two mounting components, such as a first magnetic component 403 and a second magnetic component 404. The first magnetic component 403 and second magnetic component 404 can provide sufficient magnetism to fix the Swarm capture device 400 to a metallic surface, for example, at the front sides, left and right sides of the vehicle. Therefore, it would be easy for the user to mount the Swarm capture device on the vehicle or remove the Swarm capture device from the vehicle. It should be understood that magnetic components herein are only for illustrative purposes and any other coupling mechanism, such as fasteners, actuation elements, joints, hinges, bolts, screws, etc. can also be used for movably coupling the Swarm capture device to the vehicle. The vehicle herein may be an autonomous vehicle or unmanned vehicle.

Figure 5:
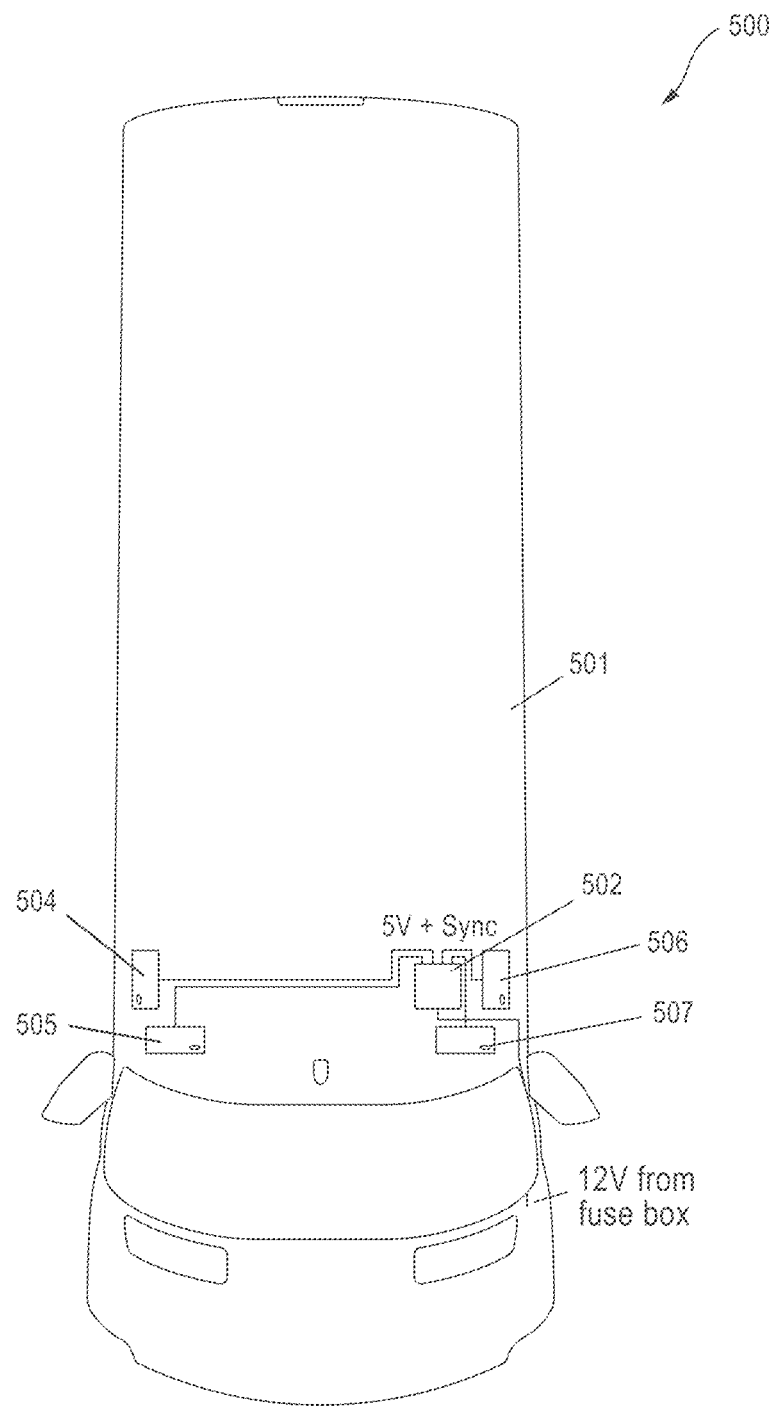
FIG. 5 shows a non-limiting example of a wiring diagram of Swarm capture devices deployed in a vehicle in accordance with some embodiments of the present disclosure.

Referring to FIG. 5, a wiring diagram 500 of Swarm capture devices deployed in a vehicle 501 is shown. In a particular embodiment, four Swarm capture devices 504, 505, 506, and 507, each of which is similar or equal to the one discussed with respect to FIGS. 2-4 are arranged on the vehicle 501. As shown, the Swarm capture devices 505 and 507 are arranged at the top of the cab of the vehicle and the lens of the cameras are forward-facing. Further, the Swarm capture devices 504 and 506 are arranged at the two sides of the cab and the lens of the cameras are sideways-facing. With the aid of this arrangement of the Swarm capture devices, the view around the front part of the vehicle can be captured. As discussed before, the Swarm capture devices can be configured to capture video or still images. In a typical configuration, two front-facing Swarm capture devices (e.g., 505 and 507) can capture video while two side facing Swarm capture devices (e.g., 504 and 506) can capture high-resolution still images.

It is to be understood that the arrangement of the Swarm capture devices herein is only for exemplary purposes and a person skilled in the art can envisage that the Swarm capture devices can be arranged at anywhere of the vehicle as appropriate. For example, the Swarm capture devices can also be disposed at the rear of the vehicle, for example, near the back mirror.

For centralized control and data synchronization, a microcontroller 502 can be optionally applied to control the Swarm capture devices, for example, for powering the Swarm captured devices with. e.g., 5V power, and for synchronizing them via Universal Serial Bus (USB) ports. To better power-up the Swarm capture devices, a DC-DC converter may be wired into a 12V power system of the vehicle using a fuse tap that is powered on when the vehicle's motor is running and powered off when the vehicle's motor stops running. In this case, custom software can be used for allowing the Swarm capture devices to detect when the vehicle's motor is running, power up and/or begin capturing when the vehicle is turned on and/or power down (e.g., enter a standby or low energy state) when the vehicle's motor is turned off. While the vehicle's motor is running, the Swarm capture device can receive power from the DC-DC converter.

Referring to FIG. 6, in a particular embodiment, a Swarm selective capture logic 600 is used for selectively taking and keeping an image, thereby ensuring the quality and effectiveness of the still images.

As shown in the flow chart of a process for taking a picture at the upper part of FIG. 6, at block 601, the still capture logic can determine whether the present time is daylight. If the present time is not daylight but at night unsuitable for taking a picture, then the logic may decide not to take a picture at block 606. However, if the present time is daylight suitable for taking a picture, then the flow proceeds to block 602, at which it is determined whether the current location is near the garage where the vehicle is parked. If it is determined that the vehicle is near the garage, for example, the vehicle not moving out of the garage, then the logic can decide not to take a picture at block 606. If the current location is not near the garage, for example, the vehicle moving out of the garage, then at block 603, the logic can further determine whether the vehicle travels equal to or more than 3 meters. If this is the case, then the Swarm capture device may take a picture at block 605. Otherwise, the flow proceeds to block 604, at which the logic can determine whether the last picture was taken 10 second ago. If this is the case, then the Swarm capture device can take a picture at block 605. If this is not the case, then the flow returns back to block 606, at which it decides not to take a picture. This may be due to the fact that frequently taking still images is not desirable in some situations.

It should be understood that the flow chart of the process for selectively taking a picture as discussed above is only for illustrative purposes and a person skilled in the art can understand that other judging conditions, in addition to time or location, can also be applied for deciding whether or not to take a still image. For example, the judging condition may be a power level or a storage level of the Swarm capture device, a given time slot for taking pictures as specified by the user. Additionally, in some instances, once the Swarm capture device is disconnected from a Wi-Fi connection and its GPS reports it has moved sufficiently far from the fleet garage, then imaging capture will begin.

As shown at a lower left side of FIG. 6, a still picture is taken by the Swarm capture device and divided into nine grids or regions, wherein a middle grid and four corner grids are denoted by 3, 1, 2, 4, 5, respectively. Based on the still picture as pre-processed in this way, a process for deciding whether or not to keep the captured still picture may be performed as illustrated in the flow chart at a lower right side of FIG. 6. At block 607, the Swarm selective capture logic may calculate a Laplacian variance for each pixel in each of five regions 1, 2, 3, 4, and 5. Then at block 608, the logic may determine whether the Laplacian variances calculated for all five regions are less than a predetermined threshold. If this is the case, then at block 609, the logic may decide to keep the picture. Otherwise, if the Laplacian variances calculated for all five regions are equal to or greater than the predetermined threshold, then the logic may decide to delete the captured picture at block 610. In this way, motion blur that may occur in the captured image can also be eliminated or alleviated. In an instance where some regions have Laplacian variances greater than the predetermined threshold, while other regions have Laplacian variances below the predetermined threshold, the image may be kept. Alternatively, the image may be kept if the number of regions having Laplacian variances greater than the predetermined threshold is less than another predetermined threshold (e.g., if Laplacian variances for a majority of regions is less the predetermined threshold). In this way, partially blurred images, such as may occur when imaging a streetscape having a fast-moving object (e.g., a car) may be retained.

It should be noted that the process for deciding whether or not to keep the picture as discussed above is only for illustrative purposes and a person skilled in the art can envisage other solutions or alternatives for deciding whether or not to keep the picture. For example, although the picture is divided into nine grids and five of them are selected, it can also be divided into more or less grids so as to meet the precision requirements. Further, although the Laplacian variance is used herein, other algorithms suitable for determining the quality of the image can also be applied as envisaged by those skilled in the art.

In some instances, watchdog software can be installed on a Swarm capture device to monitor and ensure that the image and video capture logic (or software) are working properly. In addition, the watchdog software may also be responsible for downloading and installing software or firmware updates. In some instances, in addition to taking pictures and collecting image data, the Swarm capture device can be configured to collect and generate other types of data, including but not limited to time, frame numbers, locations, accelerometer states, light levels, and counts nearby of Bluetooth/Wi-Fi devices in a separate metadata file. In case the microcontroller is being used, synchronization pulse data can also be included in the metadata file.

Figure 7:
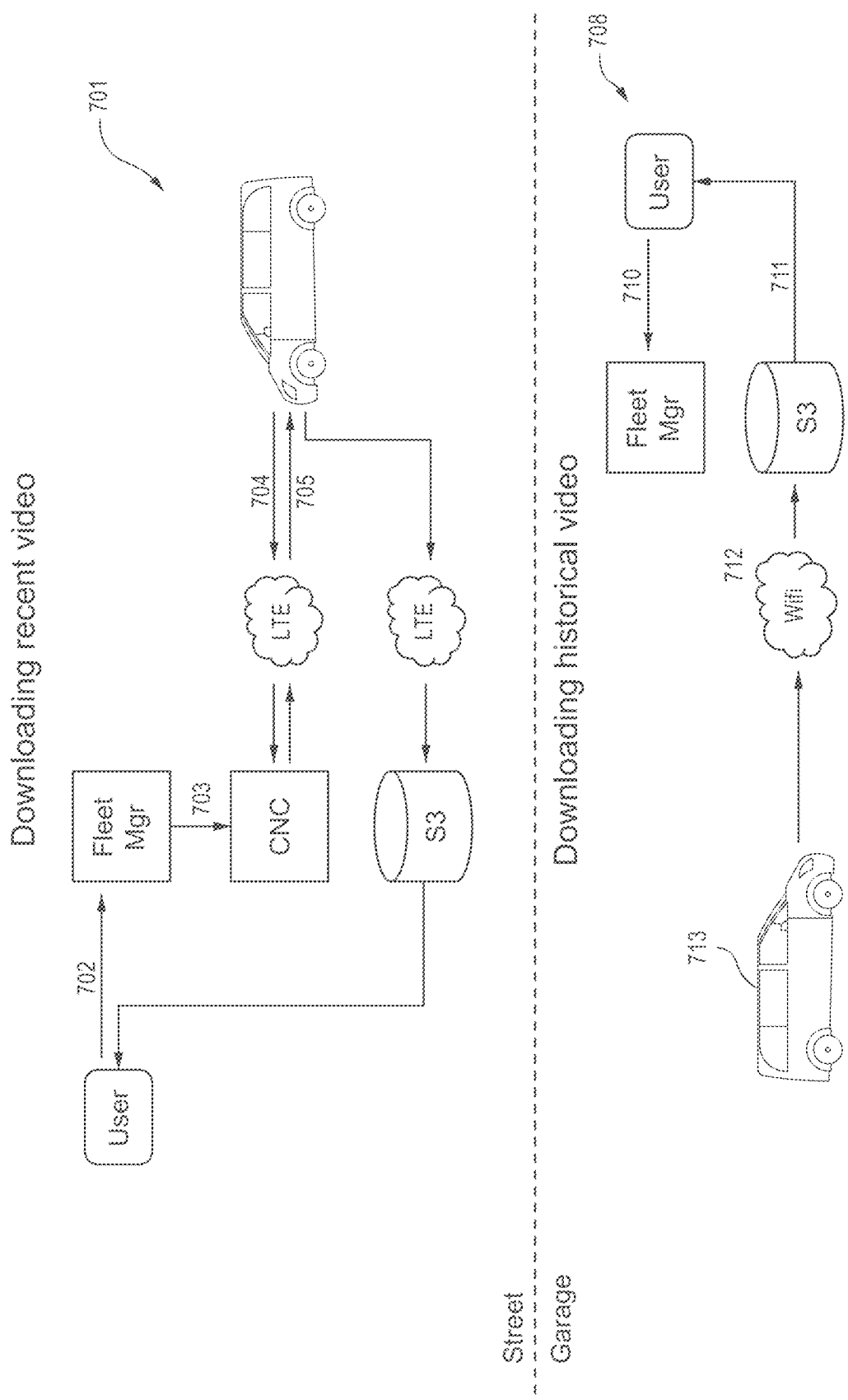
FIG. 7 shows a non-limiting example of Swarm download logic in accordance with some embodiments of the present disclosure.

Referring to FIG. 7, in a particular embodiment, Swarm download logic is used for controlling video download, wherein a process 701 for downloading recent video is shown in the flow chart at the upper part of FIG. 7 and a process 708 for downloading historical video is shown in the flow chart at the lower part of FIG. 7.

First referring to the process 701, at step 702, a customer or a client may transmit to a fleet manager a request for video onboard the vehicle 713 which can be autonomous vehicle in some instances. The request can be transmitted via a smartphone of the user, for example, with the aid of a client application installed on the smartphone. Upon receipt of the request by the fleet manager, for example, via a remote server, the fleet manager may forward the request at step 703 to a Command and Control Center (CNC) where the requests from different fleet managers may be collected and processed. Then, the CNC may transmit the request to the vehicle 713 via a wireless communication network, such as a Long Term Evolution (LTE) system. Through the LTE network, the vehicle 713 can transmit its status to the CNC at step 704 or poll the CNC for potential requests. In case the vehicle 713 receives the request at step 705, it can transmit or upload the video collected during the travel via the LTE network to a cloud storage system such as the Amazon Simple Storage Service (S3), whereby the requested or demanded video can be transmitted to the customer. In other words, the customer can download the video from the database S3 and view it locally on his or her smartphone.

It can be understood the above process can be performed when the vehicle is moving in the street or crossing blocks. Further, the steps as shown in the process 701 are only for exemplary purposes and a person skilled in the art can understand that some of the steps can be omitted or combined as appropriate. For example, in some instances, the CNC and the fleet manager may be co-located and therefore the request can be directly handled by the CNC without any involvement of the fleet manager. Additionally or alternatively, the CNC and database S3 may be also co-located and therefore the CNC may directly forward the video from the database S3 to the client without establishing a new connection between the database S3 and client. In some cases, the Swarm capture devices can send location and status reports regularly via HTTPS over the LTE network to the database S3 for records and statistical analysis. Alternatively, the Swarm capture devices can also send the location and status reports regularly or in real-time to the fleet manager such that the fleet manager can monitor the vehicle at any given time.

Now referring to the process 708, at step 702, when the vehicle 713 is driven into the garage, a Wi-Fi connection can be established with the Swarm capture devices and capturing operations performed by the Swarm capture devices may stop. Then, Swarm capture devices can offload all the image data to the database S3. Once image data has been completely offloaded and the vehicle has been turned off, the Swarm capture devices will shut down immediately. Alternatively, the offloading operations can be carried out at any suitable location upon request of the Swarm capture devices or a remote server, such as the remote server controlled by the fleet manager. Additionally, the Swarm capture devices can request offloading operations to the remote server and can begin offloading operations upon receipt of confirmation information from the remote server.

In some instances, when the user sends to the fleet manager a request for video at step 710, the fleet manager can forward the request to the database S3 through the Wi-Fi network at step 712. Upon receipt of the request from the fleet manager, the database S3 may transmit the requested video to the user at step 711. The user herein can be a person or a company, such as a third party (e.g., Zendrive), and therefore, the requested video including priority data can be used for driver analysis.

It can be understood that the process 708 can be performed when the vehicle returns to the garage or is parked in the garage. Further, the steps as shown in the process 708 are only for exemplary purposes and a person skilled in the art can understand that some of the steps can be omitted or combined as appropriate. For example, in some instances, the database S3 and the fleet manager may be co-located and therefore the request can be directly handled by the database S3 without any involvement of the fleet manager. Additionally or alternatively, the fleet manager can communicate with the database S3 via a separate connection, for example, via a LTE connection.

Figure 8:
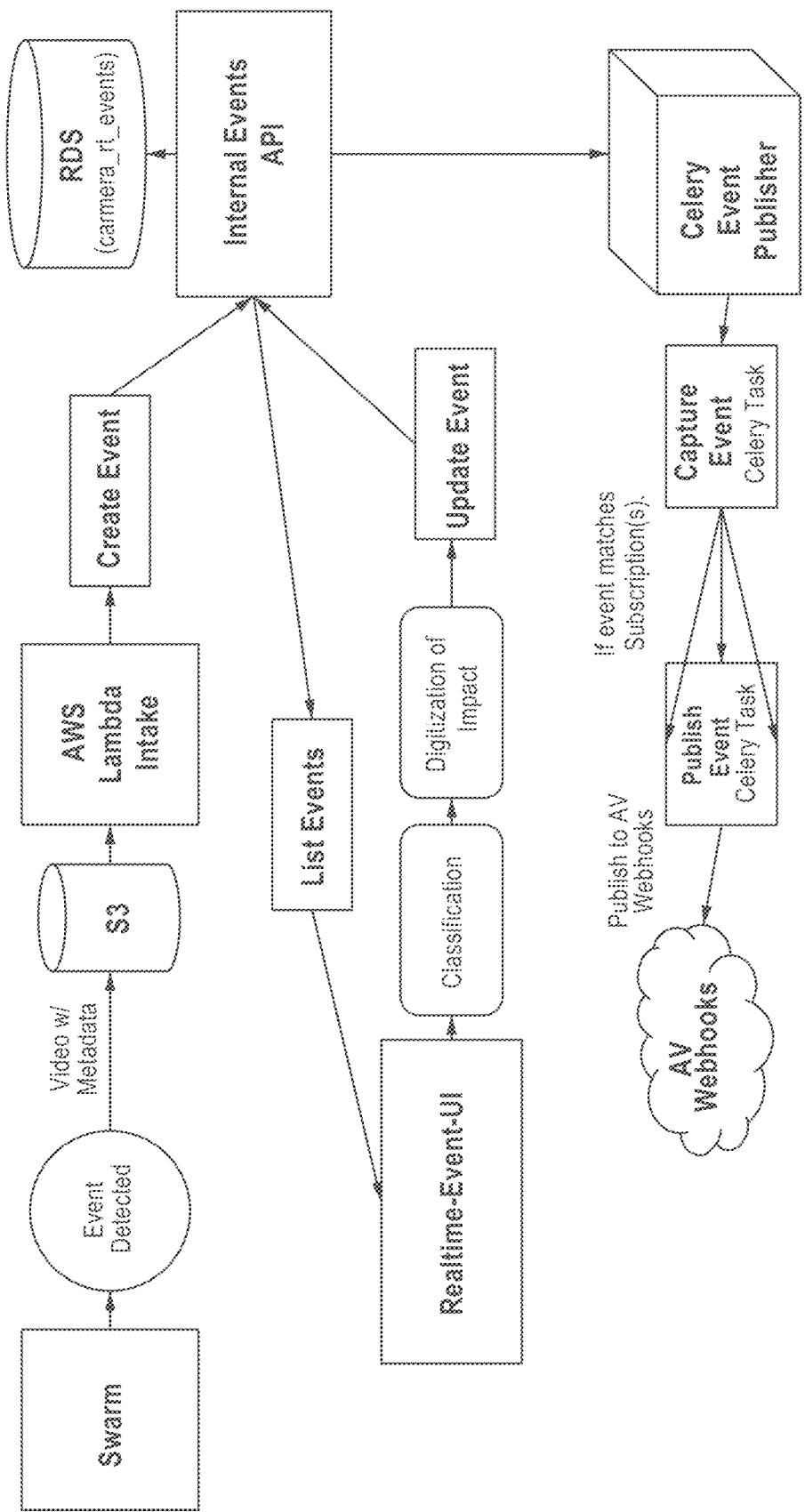
FIG. 8 is a flow chart of a method of processing video to identify high-priority events, according to an embodiment.

FIG. 8 is a flow chart of a method of processing video to identify high-priority events, according to an embodiment. At least portions of the method shown and described with reference to FIG. 8 can be performed by computing entities with relatively low computing power, such as a smartphone having a Snapdragon 820 processor. Thus, the method described with reference to FIG. 8 allows relatively modest computing resources to produce results that they would be unable to achieve using known techniques. For example, the method described with reference to FIG. 8 can identify high priority events from real-time video using a processor incapable of performing known machine vision techniques on video in real time.

A Swarm capture device can be operable to continuously record video. The video may be of high quality (e.g., having a resolution of at least 1280×720 and a frame rate of at least 30 frames/second). As discussed in further detail herein, it may not be feasible to wireless transmit continuously captured video over cellular data networks. Therefore, captured video can be stored locally, for example on memory within a smartphone housing and/or on a local hard drive or flash memory device. In some embodiments, there can be sufficient local (e.g., on-vehicle) storage capacity to store at least 4 hours, at least 8 hours, at least 12 hours, or at least 24 hours of video. In such an instance, locally stored video can be transferred to an analysis, monitoring, and/or coordination device (e.g., a Real-Time Events Service, a video-and-map-integration device, or other suitable device and/or service) via a WiFi radio/network, for example when the vehicle returns to a home base or garage. The analysis, monitoring, and/or coordination device can integrate video received from the Swarm capture devices via WiFi into the map such that the map is updated with video data received via WiFi, at least every 4 hours, every 12 hours, daily, weekly, monthly, or at any other suitable time interval. Furthermore, the analysis, monitoring, and/or coordination device can be operable send a signal representing a map updated with content received from the Swarm capture devices to a map-viewer device (e.g., a personal computer, smartphone, tablet, etc. running a web browser or map-viewer application), a Swarm capture device, and/or a navigation device. In some embodiments, the Swarm capture device can be communicatively coupled to one or more sensors, such as GPS, LiDAR, other image capture devices and/or so forth, and associate data received from such sensors with captured video. For example, GPS coordinates, LiDAR point clouds, and/or so forth can be associated with captured video and/or appended as metadata to the video.

The Swarm capture device can be operable to perform a first pass computer vision analysis of the video in real time. The first pass can identify candidate high-priority features. For example, a bandpass filtering technique can be performed on the video to identify predefined characteristic signals associated with high-priority features. For example, if a safety-orange or safety-yellow color is identified, these frames can be identified as potentially containing traffic cones or barrels. Similarly, if flashing blue or red lights are detected, the video can be identified as potentially containing emergency vehicles. The first pass can be performed in real-time, potentially at a lower frame rate than the video is captured (e.g., at 1 frame/second, 10 frames per second, 30 frames per second, etc.).

A second pass can of machine vision/machine learning analysis can be performed on frames and/or video clips identified as candidate high-priority feature. The second pass can be more computationally intensive, and the processor of the Swarm capture device may have insufficient resources to perform the analysis performed during the second pass in real time on the continuously recorded video. By selectively performing the second pass on candidate high-priority features, Swarm capture device can perform higher-quality image recognition tasks than would otherwise be possible. The second pass can, for example, identify cones, jersey barriers, roadblocks and/or barrels to identify a construction area. In addition or alternatively, the second pass can identify emergency light bars, police logos/markings, and police roadblocks. The second pass can be performed in near-real time (e.g., within five minutes of the video being captured).

High-priority events identified during the second pass can be sent to a Real-Time Event Service for further processing and/or analysis. For example, a portion of the video captured by the Swarm capture device can be uploaded with metadata (e.g., location data, time stamp, indications of high-priority features, etc.) to the Real-Time Event Service, for example over a cellular data network (e.g., LTE). In some instances, the Real-Time Event Service may possess computational and/or human resources beyond those available in the Swarm vehicle. Furthermore, the Swarm capture device may be unable to send full raw video to the Real-Time Event Service. For example, the cellular data network may have insufficient average daily bandwidth to allow the Swarm capture device to upload continuously captured video. Similarly stated, the bandwidth at which video is captured by the Swarm capture device may, on average, exceed the bandwidth of a cellular data network available to the Swarm capture device.

Figure 9:
FIG. 9 is a screenshot of a Real-Time Events Service UI, according to an embodiment.

The Real-Time Event Service can perform additional machine vision/machine learning and/or human evaluation to determine the impact of the high-priority event. For example, the Real-Time Event Service can apply machine learning models to verify the detection of event objects identified in the second pass with additional accuracy. A notification can appear in a Real-Time Events Service UI, which can be used to determine and/or record impact of the high-priority event. FIG. 9 is a screenshot of a Real-Time Events Service UI, according to an embodiment. In some embodiments, a GIS analyst, using the Real-Time Events Service UI can watch video along with a synchronized map. The analyst can determine if the high-priority event impacts traffic. A polygon can be drawn (by the GIS analyst and/or machine learning processes) and the type of impact elected (e.g., from a drop-down menu). Swarm vehicles and/or subscribed parties can be notified of the possible event, confirmation status, and impacted area. Additionally or alternatively, Swarm capture devices can periodically poll a Real-Time Events API for updates on high-priority events (e.g., occurring within a predetermined range of the Swarm vehicle) and/or the Real-Time Event Service can push updates on high-priority events to Swarm capture devices.

The Real-Time Events Service can be operable to determine when a high priority event occurred. For example, upon receiving an indication of a high-priority event from a Swarm device, the Real-Time Events Service determine if any other Swarm devices passed by the location of the high-priority event (e.g., within the last hour, last 6 hours, last 24 hours, last 48 hours, last week, etc.) and request video footage of the location of the high-priority event from any such Swarm devices. The Real-Time Event Service can analyze video received from such Swarm devices and determine a window in which the high-priority event appeared.

Swarm capture devices passing an identified high-priority events can be configured to identify the absence of the event (e.g., using a process similar to the two pass analysis described above). In the event is not detected by a subsequent Swarm capture device, the Real-Time Event Service can be configured to update the map to remove the high-priority event.

Figure 11:
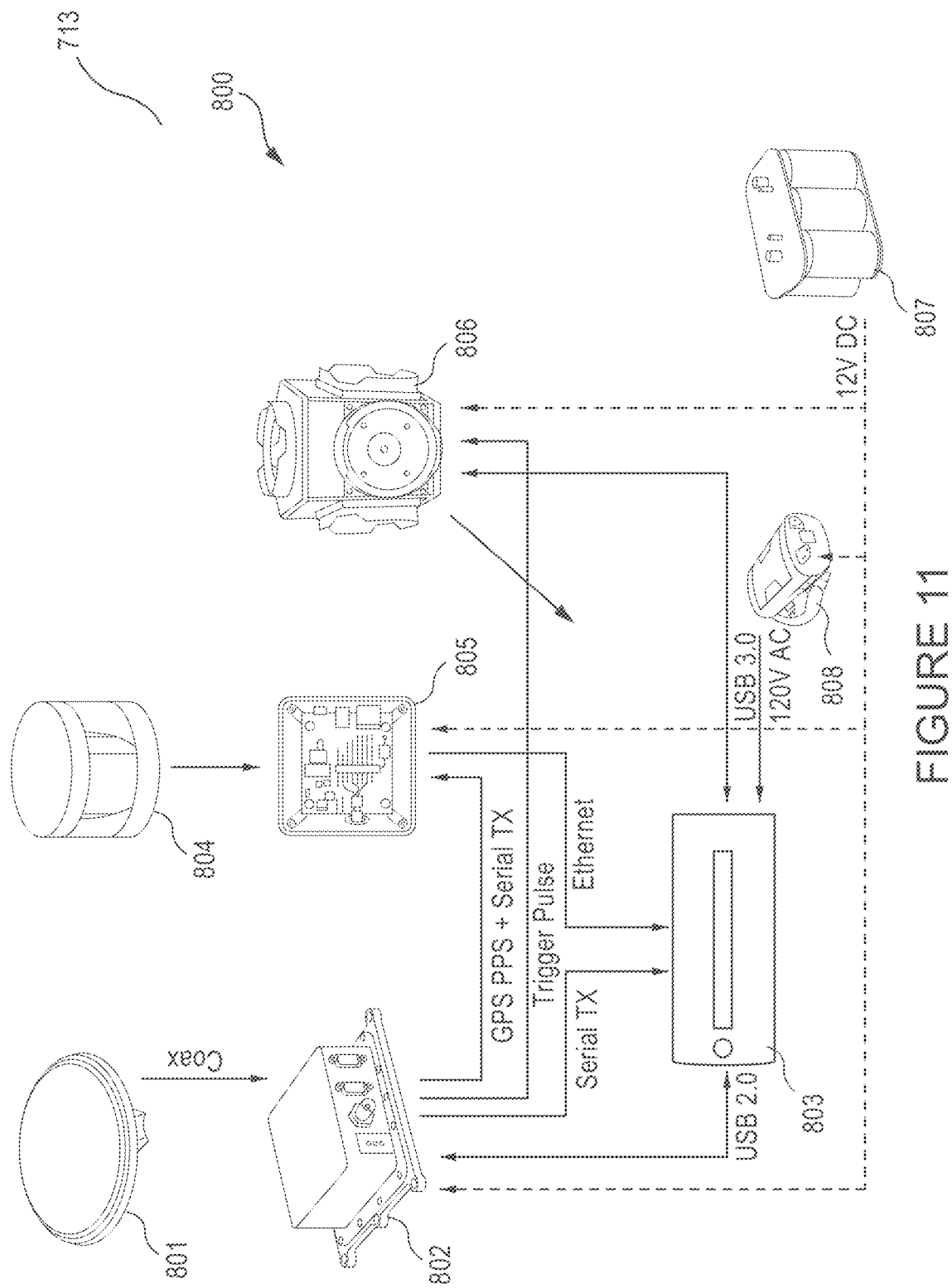
FIG. 11 shows a non-limiting example of a wiring diagram of a Mapper system in accordance with some embodiments of the present disclosure.

Referring to FIG. 11, in a particular embodiment, a Mapper 800 in accordance with some embodiments of the present disclosure can comprise an antennas module 801 (e.g., Novatel 702GG Antenna), a GPS/GNSS module 802 (e.g., Novatel SPAN-IGM-S1 GNSS), a data collection module 803, a LiDAR module 804 (e.g., Velodyne VLP-16 "Puck"), a LiDAR interface module 805 (e.g., Velodyne VLP-16 Interface), a spherical imaging module 806 (e.g., PointGrey Ladybug 5), a battery module 807 and an inverter 808, which are connected with one another via a variety of communication interfaces or cables, such as a USB 2.0, a USB 3.0, or an Ethernet port, as shown. The Mapper 800 can be installed on a vehicle that is being driven around in some areas to collect high resolution images including pictures and videos.

In some instances, the antenna module 801 can be an L1/L2 GNSS antenna, offering combined GPS+GLONASS signal reception. In some cases, users can use the same antenna for GPS only or GPS+GLONASS applications to increase integration flexibility and reduce equipment costs. The antenna unit 801 can be connected to the GPS/GNSS module 802 via a coaxial cable and transmit the received signals thereto. The GPS/GNSS module 802 can comprise a receiver for receiving the location signals from the antenna unit 801 and compute position and velocity of the vehicle with high accuracy. The GPS/GNSS module 802 can also be embedded with an Inertial Measurement Unit (IMU) to further improve the accuracy of the measurements. To this end, the GPS/GNSS module may additionally comprise one or more accelerometers (e.g., three), one or more gyroscopes (e.g., three), thereby allowing the receiver to operate in environments where very high dynamic and frequent interruption of signals can be expected.

In some instances, the LiDAR module 804 can be configured to perform laser scanning, for example, by using one or more (e.g., 16) laser/detector pairs mounted in a compact housing, which can rapidly spin to scan the surrounding environment. For example, the LiDAR module 804 can be mounted on the rear of a vehicle with the cable pointing downward and tilted 90 degrees in order to scan the road.

In some cases, the lasers fire thousands of times per second, thereby providing a rich, 3D point cloud in real-time. Further, the LiDAR module 804 can be configured to perform advanced digital signal processing and waveform analysis to provide high accuracy, extended distance sensing, and calibrated reflectivity data. In some instances, the LiDAR module 804 is capable of horizontal Field of View (FOV) of 360°, adjustable rotational speed of 5-20 rotations per second, vertical FOV of 30°, and returns of up to 100 meters dependent on application. The LiDAR module 804 can also synchronize its data with precision, GPS-supplied time pulses, enabling the users to determine the exact firing time of each laser.

In some instances, the LiDAR module 804 can be connected to the LiDAR interface module 805, which may serve as an interface box for the LiDAR module 804. As shown, the LiDAR interface module 805 can receive a once-a-second synchronization pulse (PPS) issued by the GPS/GNSS module 802 and forward it to the LiDAR module 804. Thereby, upon synchronization, the LiDAR module 804 can set its time stamp to the number of microsecond past the hour per coordinated universal time (UTC) time. Thereby, it would be easy to geo-reference the LiDAR data into a point cloud.

In some instances, the spherical imaging module 806 can receive a trigger pulse from the GPS/GNSS module 802 and capture location-based visualizations for display in geographical mapping applications. For example, the user can use the spherical vision camera to capture video in a mobile environment, and view the transmission of images as they are captured using the data collection module 803, which can be embodied as a laptop or desktop computer. In some cases, the spherical imaging module 806 is capable of 360° video streaming and covering 90% of the visual sphere. Further, the spherical imaging module 806 can be pre-calibrated and come with its own Software Development Kit (SDK), thereby allowing creation of dedicated applications for imaging capture.

In some instances, the GPS/GNSS module 802, the LiDAR interface module 805 and the spherical imaging module 806 each can connect to the data collection module 803 for data exchange, storage, synchronization and control using various interfaces, such as USB or Ethernet interfaces. The data collection module 803 herein can be a laptop computer or a desktop computer with mass storage, which may serve as a database for storage of image data.

In some instances, in order to power up one or more of the above modules, the battery module 807 is provided as a power supply. The battery module 807 herein may be an auxiliary battery on the vehicle, which is able to provide a 12V direct current (DC). As shown, this 12V DC can be directly applied to the GPS/GNSS module 802, the LiDAR interface module 805 and the spherical imaging module 806. However, in order to properly power the data collection module 803, the inverter 808 can be introduced to convert 12V DC into 120V alternating current (AC).

In some instances, a wheel encoder can be used for converting the angular position or motion of a shaft or axle of the vehicle to an analog or digital code. The analog or digital code can be further processed into information such as speed, distance and position, thereby providing further details of the vehicle in motion.

Swarm Processing

Figure 10:
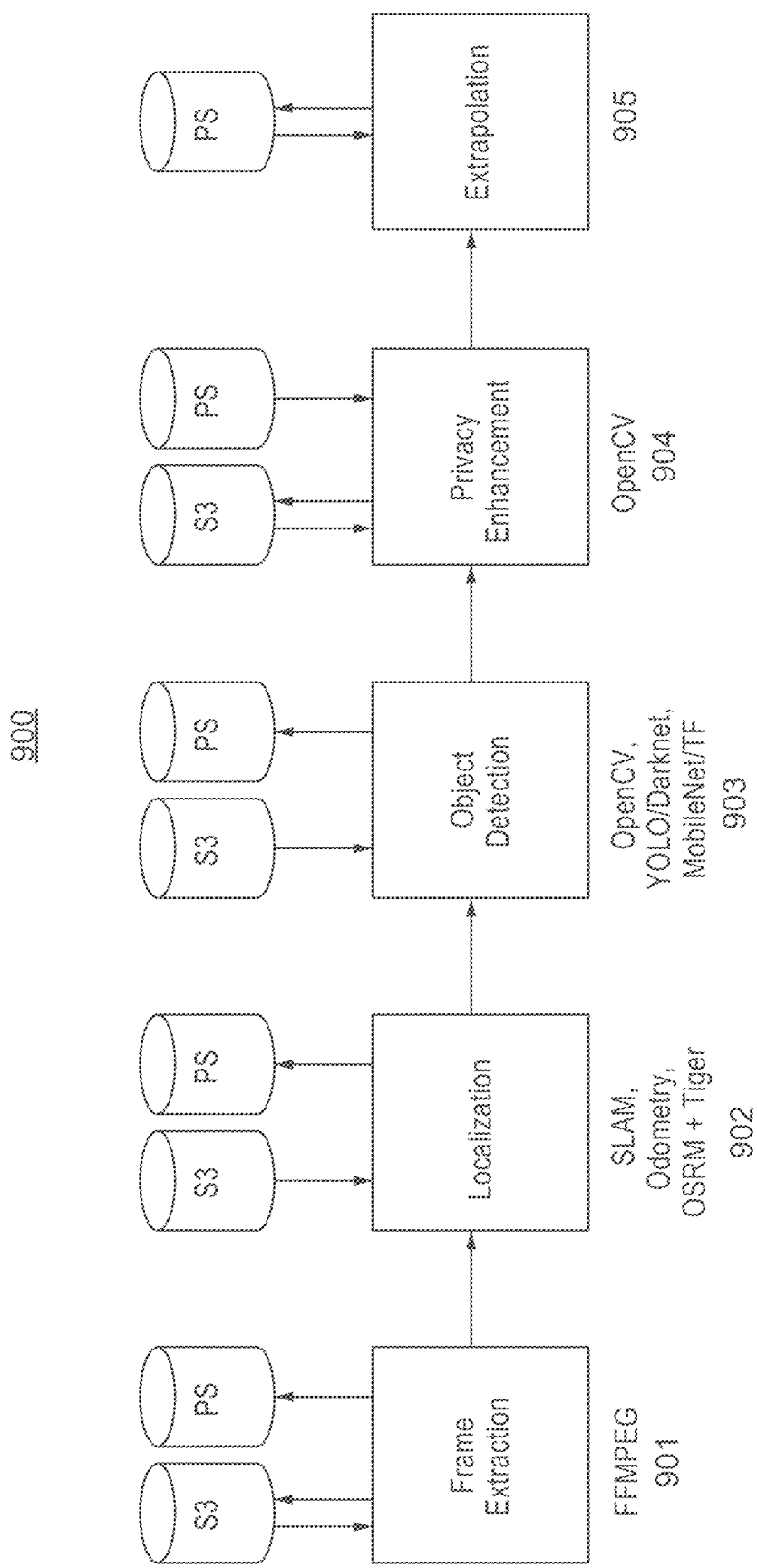
FIG. 10 shows a non-limiting example of a processing pipeline for a Swarm system, according to an embodiment.

Referring to FIG. 10, in a particular embodiment, once image data is uploaded to the Swarm system as shown in FIG. 1, a processing pipeline 900 will start to process it. All images data is stored in file storage or database S3 and other kinds of data are stored in a database PG. All data is associated to edges roughly equal to street segments. In some instances, as shown in the upper part of FIG. 11, the pipeline 900 of the Swarm system may perform the following steps at corresponding blocks while exchanging data with associated databases:

a) Extract frames from video using FFMPEG and associate frames with metadata at block 901;

b) Correct location data using heuristics and mapping data at block 902 (OSRM+Tiger);

c) Locate objects, such as pedestrians, cars, street signs, street lights, etc., within imagery using trained machine learning models, such as YOLO detection at block 903;

d) If necessary, blur images of pedestrians using OPENCV at block 904;

e) Extrapolate raw pedestrian counts into foot traffic data at block 905; and f) Detects changes in mapping inventory, including, for example, new high-priority events, the removal of old high-priority events, changes in vehicle or pedestrian traffic, and/or so forth.

Extrapolating Pedestrian Counts

Known methods of estimating pedestrian counts typically involve examining video of fixed cameras. When using fixed cameras, a fairly accurate count of pedestrians can be determined for particular locations, but little to no pedestrian information is available for areas for which camera coverage does not exist. Using mobile cameras, such as Swarm capture devices described above, can increase the area for which pedestrian counts can be determined with a given number of cameras, but introduces several new challenges. In particular, mobile cameras coverage area and coverage gaps can change in unpredictable manners and video depicting a particular street segment may be received only on an irregular basis. The following method describes a technique(s) that can be used to extrapolate pedestrian counts based on inconsistent coverage:

e1) Swarm images can be queried and congregated into single time slots that represent a single vehicle pass on a street segment. This can be performed on a periodic basis, such as daily, weekly, etc. Similarly stated, video data from multiple Swarm capture devices can be received and bucketized. For example, video for each Swarm capture device can be subdivided into a bucket for each street segment (e.g., intersection to intersection) captured by that Swarm capture device.

e2) Swarm images (e.g., bucketized Swarm images) can be processed by Darknet YOLO or any other suitable image processing technique to attribute tags to images. For example, each still image from a video segment (e.g., corresponding to a bucket associated with a street segment) can be analyzed to identify the number of pedestrians in that image. The total number of people seen for the video segment can be divided by the number of frames in that video to determine an average pedestrian count for the video segment, which may be associated with a street segment.

e3) As discussed in further detail below, to determine a foot-traffic count for a selected street segment, pedestrian data for a time period and for the selected street segment can be combined with pedestrian data from immediately adjacent street segments. Similarly stated, video of any street segments that intersect the selected street segment can be analyzed to determine the number of pedestrians for those adjacent street segments. Video of adjacent street segments can be analyzed over any suitable time period, such as a week, a month, a year, etc.

e4) If multiple videos have been collected for the selected street segment or adjacent street segments, pedestrian counts can be de-duplicated by any suitable means (such as aggregating passes and dividing by number of passes).

e5) An hourly histogram (or a histogram of any other suitable interval) can be calculated based on historic observations of pedestrians, such as past observations made by Swarm devices and/or based on publicly available pedestrian count data. Hourly histogram(s) can be used to extrapolate the pedestrian count from individual vehicle passes to a total day count. Hourly histograms can be used to estimate pedestrian counts for the selected or adjacent street segments during periods (e.g., hourly periods) for which no video is available. Daily projections for the selected street segment and/or adjacent street segment can be determined by summing hourly histograms over a 24 hour period.

e6) An inter quartile range algorithm can be applied to the approximate day projections to remove outliers.

e7) If the multiple vehicle passes exist for the adjacent street segments, those adjacent street segment counts can be used to estimate pedestrian for the selected street segment. For example, an average (or other measure of central tendency) pedestrian count of adjacent street segment values can be calculated, outliers can be removed, and an average (or other measure of central tendency) between adjacent street segments and the selected segment can be computed.

e8) If selected street segment counts are missing (e.g., if no video of the selected street segment is available to calculate pedestrian counts for a particular period), the average (or other measure of central tendency) of the adjacent street segments can be used to estimate the average (or other measure of central tendency) pedestrian count for the selected street segment and the period. For example, for each adjacent street segment for which video was received during the time period, image recognition of such video can be performed to produce a pedestrian count for that adjacent street segment. An average (or other measure of central tendency) of pedestrian counts of adjacent street segments can be used to estimate the pedestrian count of the selected street segment during that time period.

e9) The daily projection of foot traffic for a selected segment can be used to approximate a monthly foot traffic projection by multiplying by 365/12.

Detecting Mapping Inventory Changes

Mapping inventory for continuously updated based on newly received information (e.g., from Swarm system elements and/or Mapper system elements). For example, permanent and/or temporary changes to roads and/or traffic conditions can be detected and integrated into available maps. In some instances mapping inventory can be tracked for particular locations, such as points of interest, intersections, addresses, and the like. In such an instance, video collected from in the vicinity of the particular location (e.g. an intersection) can be analyzed based, for example, on metadata associated with the video. Images likely to depict the particular location (e.g., images likely to be showing crossing though an intersection) can be analyzed. For each image, the set of mapping objects that is most commonly detected can be identified. For the winning set of objects, the object types and relative positions can be associated with the intersection. Changes to the particular locations can be identified by identifying changes in the objects associated with the intersection. For example, during periodic mapping inventory updates (e.g., nightly, weekly, monthly, etc.) images of the particular location received during that period can be analyzed. If the set of images received during the period includes objects that match the set of objects associated with the intersection, the intersection can be considered unchanged. If, however, the set of images received during the period does not include objects associated with the intersection, for example, if objects received during the period includes objects that deviate from objects associated with the intersection by more than a threshold amount, then the images, video, and/or associated metadata can be passed to an Events Service UI, such as shown and discussed above with reference to FIGS. 8 and 9. A GIS analyst and/or machine learning process can determine if the inventory has changed and/or update the mapping inventory (e.g., indicate that a lane is closed due to construction, changes in traffic patterns, lane markings, and so forth).

Figure 12:
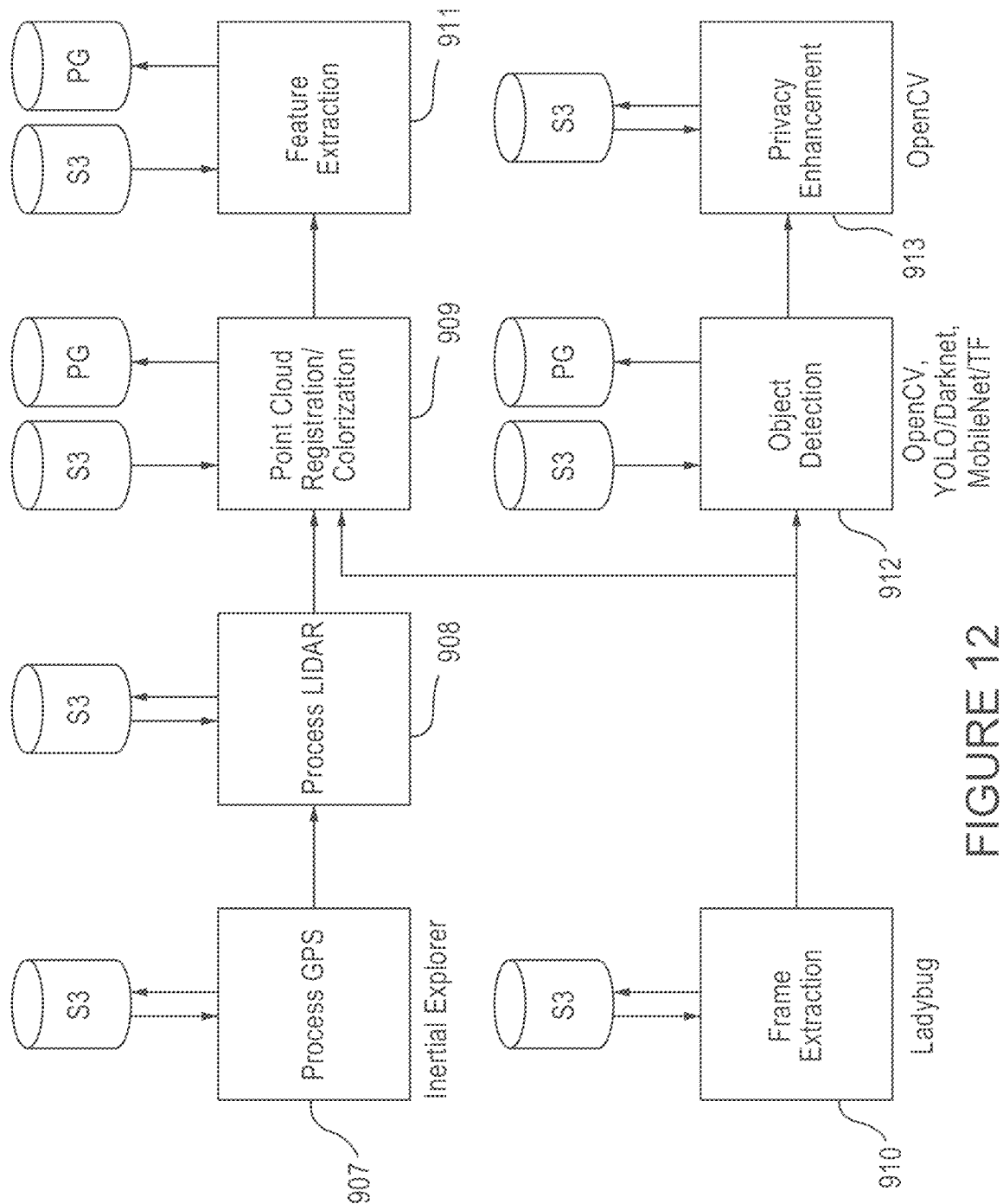
FIG. 12 shows a non-limiting example of a processing pipeline for a mapper system, according to an embodiment.

Further referring to FIG. 12, in a particular embodiment, once image data is uploaded to the Mapper system as shown in FIG. 1, a processing pipeline 906 will start to process it. All images data is stored in file storage or database S3 and other kinds of data are stored in a database PG. The data herein may include raw network PCAP files, PGR files, and GPS files. All data is associated to edges roughly equal to street segments. In some instances, the pipeline 906 of the Mapper system may perform the following steps at corresponding blocks while exchanging data with associated databases:

a) Automate Novatel Inertial Explorer to process GPS files into GNSS files that have corrected location data using the IMU data, wheel encoder data, and public base station data at block 907;
  b) Extract LiDAR data from PCAP and combine with GNSS data to create point cloud slices in CSV files and position/orientation information in POSE files, and further extract rectified and panoramic imagery from Ladybug PGR files into JPG files at block 908;
  c) Combine SCAN, POSE and rectified JPG files to create registered and colorized point cloud slices at block 909, wherein the Iterative Closest Point (ICP) is applied herein to correct for poor GPS data, and Colorized point clouds and updated POSE information are saved to CSV and POSE files; and
  d) Perform feature extraction (described below) to identify streets, sidewalks, poles, and building facades at block 911.

Feature Extraction

In some instances, the feature extraction can be performed in different stages as follows:

Stage 1 a) Compute normals at each 3D point by local plane fitting;
  b) Use the 3D points and normals of the scan perform a RANSAC plane fitting algorithm, detect planes with vertical normals (i.e. horizontal planes), keep the biggest two such horizontal planes and refer the set of points in these horizontal planes as Points_Ransac;
c) Perform a Euclidean clustering (e.g., PCL Euclidean cluster extraction) on the points in Points_Ransac;
d) Keep the largest of the clusters computed in step (c) and refer the set of these points as Points_Clustered;
e) For each 3D point in the scan, compute its maximum distance from the horizontal planes computed in step (b), wherein the distance is an approximation of the height from the ground for each 3D point;
f) Add points that are not in Points_Clustered, with a height from the ground below a given threshold, in Points_Clustered;
g) Label each 3D point with a label "ground" if it belongs to Points_Clustered and a label "ransac" if it belongs to Points_Ransac and label each 3D point not in Points_Clustered with a label "non-ground," wherein each point is assigned a distance from the ground.

Stage 2
a) Build a K-D tree index of points in Points_Clustered (i.e. ground points) for fast search.
b) For each 3D point P in Points_Clustered:
  i) Reconstruct a scanline neighborhood around P, by computing a neighborhood of points using Euclidean clustering, and by sorting the points based on the angle of the sensing direction;
  ii) Move forward and backward in the scanline neighborhood to detect sudden changes in depth using a cumulative statistic. If such a change is detected, the point of change is marked as a possible curb point; and
c) Output: points in scan that could be on curbs are labeled as possible-curb-point.

Stage 3
a) Place all possible-curb-points from all scans into a set referred to as Points_Possible_Curbs;
b) Place all ground points from all scans into a set referred to as Points_Ground;
c) Place the sequence of scanner positions (from global poses) into a list Scanner_Positions;
d) Cluster the points Points_Possible_Curbs into components using Euclidean clustering, and discard small clusters;
e) For each cluster from step (d), order points in sequence following scanner's movement by finding closest scanner positions in Scanner_Positions;
f) Subsample ordered points of step (e) and smooth them, thereby generating a set of polylines or curves;
g) Organize the curves of step (f) into left and right curves based on whether each curve is to the left or the right of the moving scanner (represented by Scanner_Positions);
h) Process the left curves in sequence, and decide whether to connect with the next curve. The connection is decided based on various criteria, such as: 1) whether the connection between the curves traverses empty space wrt Points_Ground (i.e. in the case a parked car is occluding the curb), 2) the length of the connection, 3) the angle between the line connecting the curve endpoints and the curves themselves, and 4) the distance between the connecting curve and the scanner trajectory.
i) Perform step h) for the right curves; and
j) Output: a sequence of curb curves on the left and right of the sensor trajectory.

Stage 4
a) Re-label as road the Points that are labeled ground or non-ground (but at a height from the ground smaller than a threshold) and being in between a left and right curb curve;
b) Label as sidewalk the points that are labeled ground, or non-ground (but at a height from the ground smaller than a threshold) that are to the left of the left curb curve;
c) Label as sidewalk the points that are labeled ground, or non-ground (but at a height from the ground smaller than a threshold) that are to the right of the right curb curve;
d) Perform a RANSAC plane clustering to the non-road and non-sidewalk points into non-horizontal planes, wherein the points on such RANSAC planes that are to the left or to the right of the curb curves are labeled as facades.
e) Output: points of each Velodyne scan are labeled either as a road, a sidewalk, facade, or others.

The above has described in detail the operations of the feature extraction using multiple stages. It is to be understood that the processing stages herein are only for illustrative purposes and a person skilled in the art can envisage other stages or steps to perform the feature extraction based on the teaching herein. In addition, the Mapper system can also process the GPS data at block 910, and perform Pedestrian detection and blur faces at blocks 912 and 913 using the same or similar algorithms as the Swarm system.

As previously noted, according to the embodiments of the present disclosure, the data from the Mapper and Swarm systems can be merged, thereby improving the efficacy of each system. For example, the system can compare the features in Mapper data to features in Swarm data to improve the Swarm accuracy. The exemplary steps are as follows:
  a) Perform feature extraction on Mapper 2D data to detect landmarks;
  b) Perform feature extraction on Swarm data to detect landmarks;
  c) Compare Swarm features within 100 m of each Mapper feature to find the same landmarks; and
  d) Update the Swarm location data when matching features are found.

Figure 13:
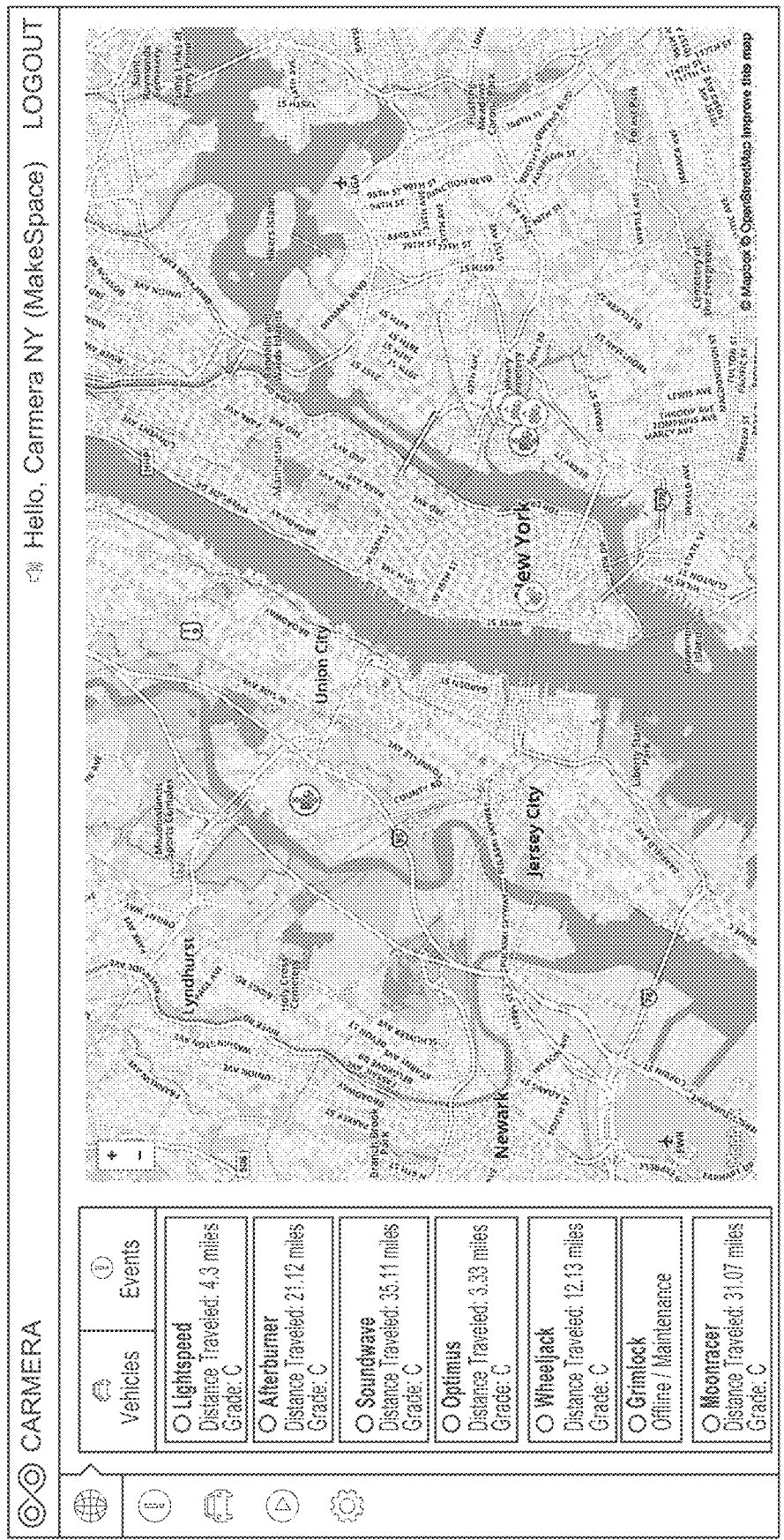
FIG. 13 shows a non-limiting example of a Graphic User Interface (GUI) for a fleet manager in accordance with some embodiments of the present disclosure.
Figure 14:
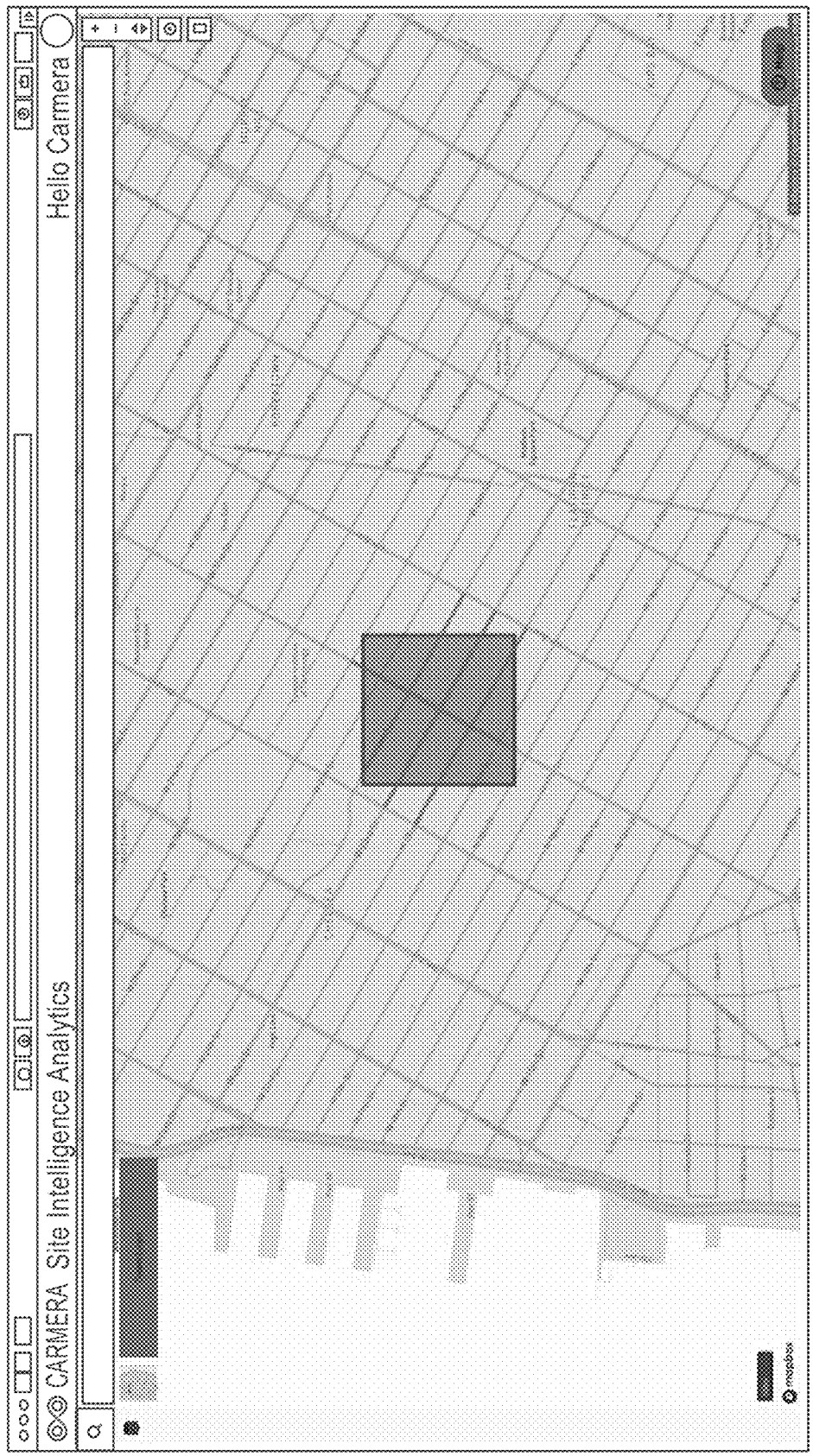
FIG. 14 shows a non-limiting example of a GUI for a street level intelligence platform including a selection tool to examine pedestrian counts, according to an embodiment.
Figure 15:
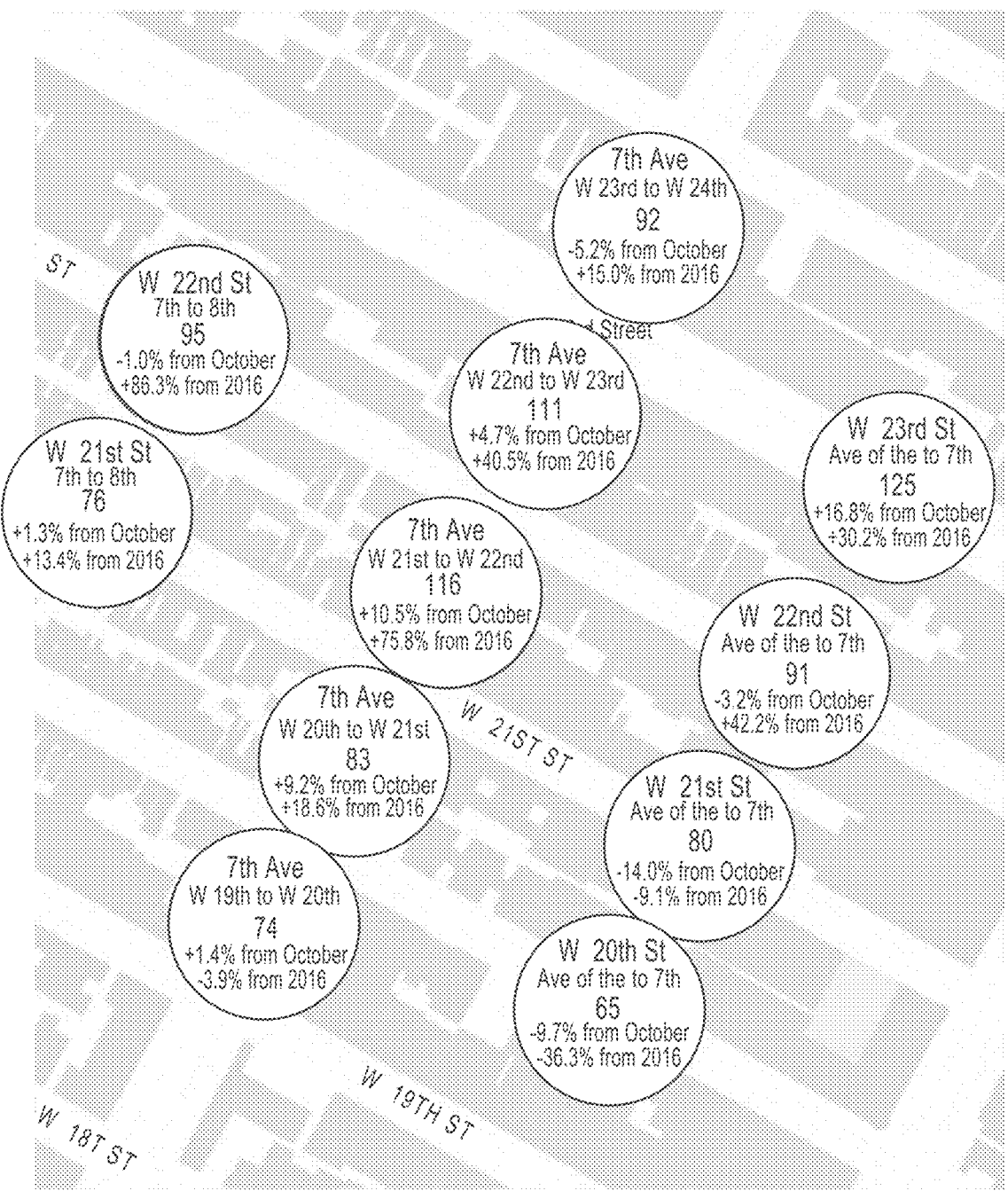
FIG. 15 shows an example of a pedestrian report for the area as selected according to the GUI of FIG. 14.

Referring to FIG. 13, in a particular embodiment, a web application, which can be used by a fleet manager and referred to as "fleet manager software," is capable of controlling and monitoring the vehicles using the street level intelligence system. The application can be configured to allow the fleet manager to carry out multiple actions, including but not limited to:
  a) see the current location of each fleet vehicle;
  b) download video already offloaded;
  c) request priority offload over LTE; and
  d) view driver quality data from Zendrive.

As illustrated in FIG. 13, there are six vehicles on the road and shown in real-time on the map. The "Vehicle" column lists these six vehicles with their respective name, traveled distances, and grades. The vehicle named "Grimlock" is shown grey in the list as it is offline and in maintenance. The vehicles herein may be outfitted with the Swarm systems as discussed above and elsewhere in the specification. It should be understood that the user interface shown in FIG. 12 can be a homepage of the fleet manager software.

Figure 16:
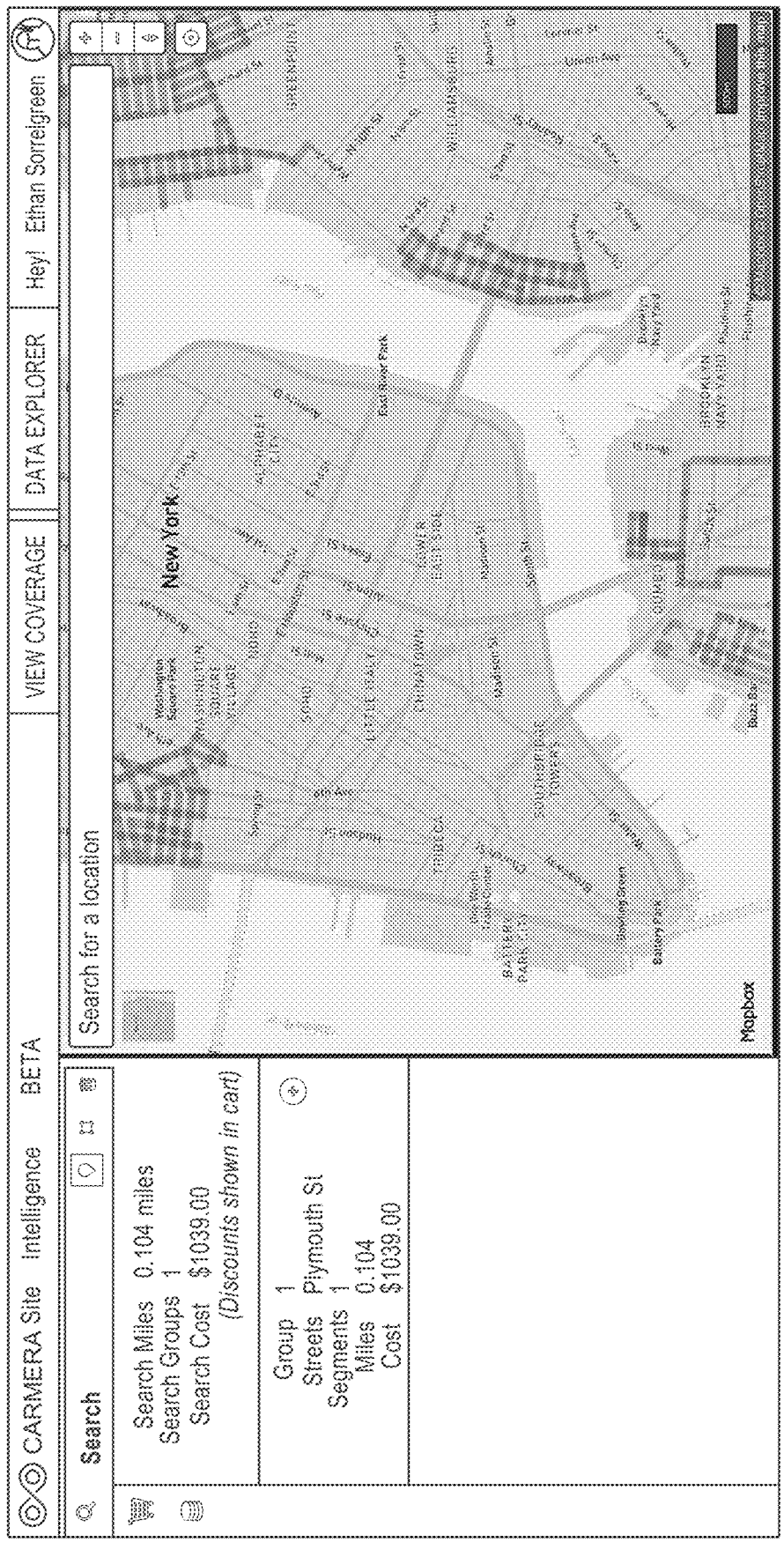
FIG. 16 shows a non-limiting example of a GUI for a street level intelligence platform in accordance with some embodiments of the present disclosure.

Referring to FIG. 16, in a particular embodiment, a web application, which can be used by a customer and referred to as "street level intelligence software," is capable of providing site intelligence payload to the customer. The web application herein can be configured to allow the customers to carry out the actions, including but not limited to:
- a) view a map overlaid with segments for which pertinent data has been collected;
- b) select one or more segments and add them to a cart;
- c) pay for access to segments using a credit card;
- d) download a payload for those segments containing either 3D/2D site intelligence or pedestrian analytics;
- e) access previously-paid payloads; and
- f) share payloads with partners or other customers.

In some instances, the site intelligence payload may comprise the following:
- a) stitched color 3D point cloud (see Stitching Process as below);
- b) panoramic images;
- c) panoramic viewing software; and
- d) metadata and instructions.

As an example, the steps for stitching point cloud data are as follows:
- a) Colorized scans are gathered for segment runs, ordered by capture date;
- b) Scans are filtered to eliminate stalled traffic redundancy (movement checked);
- c) Ensure that the scans have an acceptable count based on segment length and cleaned scan count;
- d) Concatenate the filtered scans into a single xyz file; and
- e) Resultant file is passed to a las converter binary which exports a las file.

In some instances, the pedestrian analytics payload may contain the following information:
- a) a PNG map of the requested segments overlaid with a infographics representing estimated pedestrian foot traffic for each segment; and
- b) a CSV containing raw data that can be imported into other software.

As illustrated in FIG. 16, the customer can input areas or segments of interest in the Search field. Further, the customer can select the cart icon as shown and place the segments selected from the map into it. In some cases, the customer can also see the discounts shown in the cart. Finally, the customer can select coin icon as shown to pay the search fees using for example, credit cards. In response, the street level intelligence software according to the embodiments of the present disclosure can provide items, such as Search miles, Search groups, or Search cost for customer's viewing. Additionally, the customer can order other data that is interested to him or her, such as the PNG map of the searched segments or CSV files.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Executable Instructions

In some embodiments, the platforms, systems, media, and methods disclosed herein include processor executable instructions, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of vehicle, location, image, feature, and street level intelligence information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

What is claimed is:

1. A method, comprising:
receiving video depicting street segments from vehicle-mounted smartphones;
bucketizing the video into buckets that are separately associated with segments of the video capturing a street segment from the street segments by one of the vehicle-mounted smartphones;
identifying (i) a selected segment of the street segments for which no video is received during a time interval and (ii) adjacent segments that are adjacent to the selected segment;
calculating a number of pedestrians for each of the adjacent segments during the time interval using image recognition and pedestrian counts for the adjacent segments by dividing the number of pedestrians for each of the adjacent segments by a number of video frames associated with the adjacent segments; and
estimating a pedestrian count for the selected segment according to an average of the pedestrian counts associated with the adjacent segments.

2. The method of claim 1, wherein video depicting a particular street segment from the street segments is received irregularly.

3. The method of claim 1, wherein estimating the pedestrian count includes generating histograms of the pedestrian counts observed for the adjacent segments on an hourly basis.

4. A system, comprising:
a processor; and
a memory storing instructions that, when executed by the processor, cause the processor to:
receive video depicting street segments from vehicle-mounted smartphones;
bucketize the video into buckets that are separately associated with segments of the video capturing a street segment from the street segments by one of the vehicle-mounted smartphones;
identify (i) a selected segment of the street segments for which no video is received during a time interval and (ii) adjacent segments that are adjacent to the selected segment;
calculate a number of pedestrians for each of the adjacent segments during the time interval using image recognition and pedestrian counts for the adjacent segments by dividing the number of pedestrians for each of the adjacent segments by a number of video frames associated with the adjacent segments; and
estimate a pedestrian count for the selected segment according to an average of the pedestrian counts associated with the adjacent segments.

5. A non-transitory computer-readable medium storing instructions that, when execute by an electronic processor, cause the electronic processor to:
receive video depicting street segments from vehicle-mounted smartphones;
bucketize the video into buckets that are separately associated with segments of the video capturing a street segment from the street segments by one of the vehicle-mounted smartphones;
identify (i) a selected segment of the street segments for which no video is received during a time interval and (ii) adjacent segments that are adjacent to the selected segment;
calculate a number of pedestrians for each of the adjacent segments during the time interval using image recognition and pedestrian counts for the adjacent segments by dividing the number of pedestrians for each of the adjacent segments by a number of video frames associated with the adjacent segments; and
estimate a pedestrian count for the selected segment according to an average of the pedestrian counts associated with the adjacent segments.

* * * * *